United States Patent
Cho

(10) Patent No.: US 9,336,819 B2
(45) Date of Patent: May 10, 2016

(54) APPARATUS AND METHOD FOR WRITING DATA BASED ON DRIVE STATE

(75) Inventor: Hyung Joon Cho, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 166 days.

(21) Appl. No.: 13/458,966

(22) Filed: Apr. 27, 2012

(65) Prior Publication Data

US 2013/0031406 A1    Jan. 31, 2013

(30) Foreign Application Priority Data

Apr. 27, 2011  (KR) .................... 10-2011-0039711

(51) Int. Cl.
*G06F 11/00* (2006.01)
*G11B 20/18* (2006.01)
*G08B 13/14* (2006.01)
*G08B 21/24* (2006.01)

(52) U.S. Cl.
CPC ............ *G11B 20/18* (2013.01); *G08B 13/1427* (2013.01); *G08B 21/24* (2013.01); *G11B 20/1879* (2013.01)

(58) Field of Classification Search
CPC ............ G06F 11/0727; G06F 11/1666; G11B 2220/20; G11B 20/1883
USPC ......................................... 714/42, 6.1, 1, 54
See application file for complete search history.

(56) References Cited

U.S. PATENT DOCUMENTS

| | | | |
|---|---|---|---|
| 7,440,221 B2 | 10/2008 | Tsuchinaga | |
| 7,685,360 B1 * | 3/2010 | Brunnett et al. | 711/112 |
| 7,982,994 B1 | 7/2011 | Erden | |
| 8,179,627 B2 | 5/2012 | Chang | |
| 8,181,089 B1 * | 5/2012 | Fernandes | G06F 11/1076 714/25 |
| 8,270,256 B1 | 9/2012 | Juang | |
| 2002/0039244 A1 * | 4/2002 | Wilson | 360/25 |
| 2004/0042105 A1 * | 3/2004 | Cho | 360/31 |
| 2005/0264916 A1 * | 12/2005 | Cho et al. | 360/75 |
| 2007/0030588 A1 | 2/2007 | Tsuchinaga | |
| 2008/0130434 A1 * | 6/2008 | Morimoto | 369/47.14 |
| 2008/0222490 A1 * | 9/2008 | Leung et al. | 714/763 |
| 2011/0085266 A1 | 4/2011 | Kanai | |
| 2011/0222186 A1 | 9/2011 | Itakura | |
| 2011/0292545 A1 | 12/2011 | Katada | |

(Continued)

OTHER PUBLICATIONS

Garth Gibson, Directions for Shingled-Write and Two-Dimensional Magnetic Recording System Architectures: Synergies with Solid-State Disks, Carnegie Mellon University, May 2009, pp. 1-2, Pittsburgh, US.

*Primary Examiner* — Yair Leibovich
(74) *Attorney, Agent, or Firm* — Cesari & Reed, LLP; Kirk A. Cesari

(57) ABSTRACT

Disclosed are an apparatus and method for writing data based on a drive state. In one embodiment, a method may comprise receiving a command to store data to a first area of a data storage device, detecting whether the data storage device is in a first state indicating a lowered write reliability, and writing the data to a second area when the first state is detected, the second area having a higher write reliability than the first area. In another embodiment, an apparatus may comprise a processor configured to receive a command to write data to a first area of a data storage device, detect whether the data storage device is in a first mode indicating a reduced writing reliability relative to a second mode, and write the data to a second area of the data storage device when the first mode is detected.

21 Claims, 21 Drawing Sheets

(56) References Cited

U.S. PATENT DOCUMENTS

| | | |
|---|---|---|
| 2012/0060073 A1 | 3/2012 | Itakura |
| 2012/0069466 A1 | 3/2012 | Okamoto |
| 2012/0082019 A1* | 4/2012 | Harigae ............. G11B 20/1883 369/53.41 |
| 2012/0099216 A1 | 4/2012 | Grobis |
| 2012/0162808 A1* | 6/2012 | Masuda ................. G11B 5/012 360/59 |
| 2012/0194937 A1 | 8/2012 | Tagami |
| 2013/0170061 A1* | 7/2013 | Saito ...................... G11B 5/024 360/39 |
| 2013/0227361 A1* | 8/2013 | Bowers et al. ................ 714/710 |

* cited by examiner

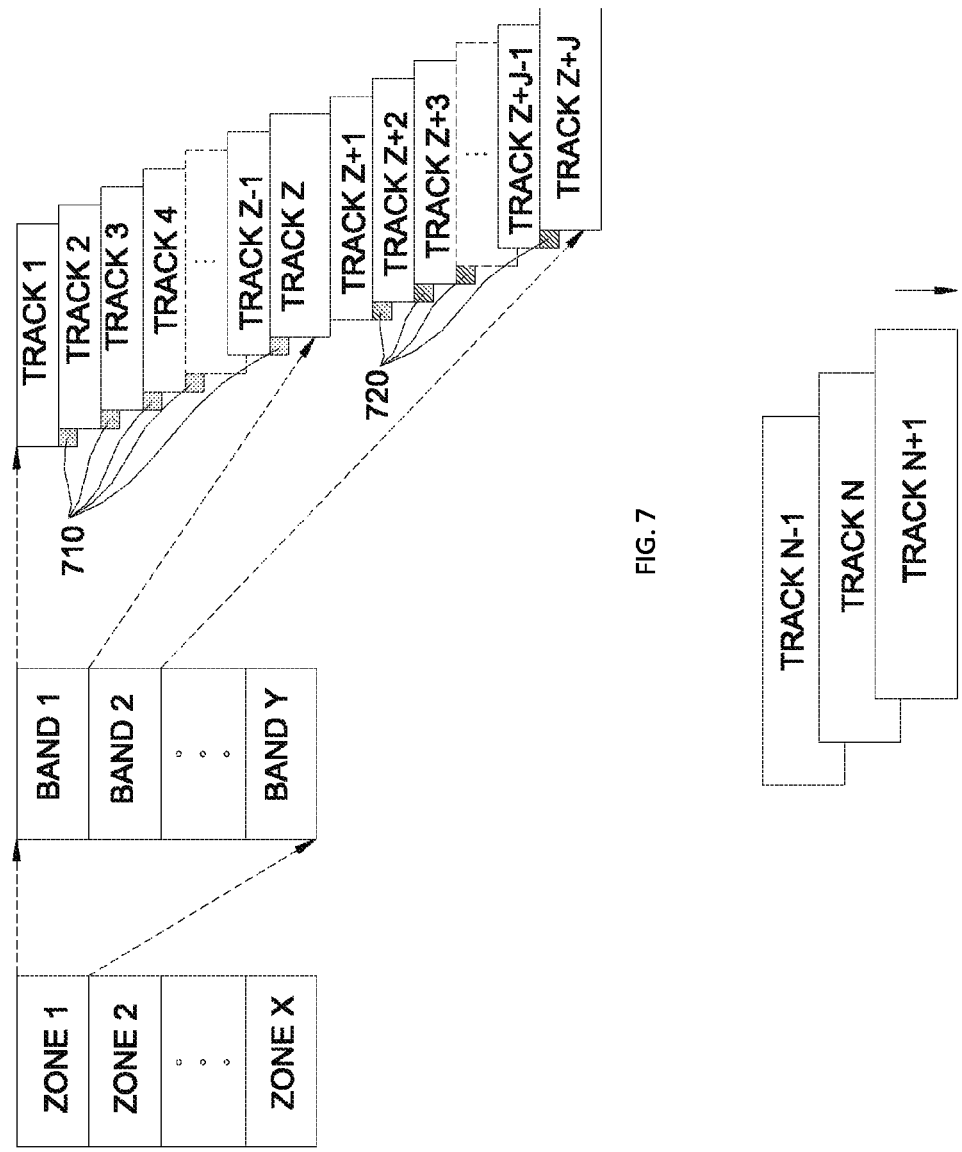

APPARATUS AND METHOD FOR WRITING DATA BASED ON DRIVE STATE

CROSS-REFERENCE TO RELATED APPLICATION

This application claims priority under 35 U.S.C. §119(a) of Korean Patent Application No. 2011-0039711, filed on Apr. 27, 2011, the entire disclosure of which is hereby incorporated by reference.

BACKGROUND OF THE INVENTION

1. Field of the Invention

The present disclosure relates to a write method and a storage device using the method, and particularly, to a write method providing enhanced data reliability under such conditions where a write operation is not performed properly, and a storage device using the method.

2. Background of the Invention

A disc drive, which is one of storage devices, contributes to the operation of a computer system by writing data to a storage medium in response to a command that is issued by the host device, or reading data from the storage medium. A variety of write methods have been studied to improve the recording density of the disc drive. Further, there is a need for a new method to access a storage medium that is suitable for a new write method with a higher recording density.

In one embodiment a method may comprise receiving a command to store data to a first area of a data storage device, detecting whether the data storage device is in a first state indicating a first level of reliability in writes to the first area, and writing the data to a second area of the data storage device when the first state is detected, the second area having a different data storage characteristic than the first area.

In another embodiment, an apparatus may comprise a data storage device including a data storage medium having a first area and a second area, the second area having a different data storage characteristic than the first area; a controller configured to receive a command to write data to the first area; determine whether the data storage device is in a first mode, the first mode indicating a first level of reliability in writes to the first area; and write data pursuant to the command to the second area when the data storage device is determined to be in the first mode.

In another embodiment, an apparatus may comprise a processor configured to receive a command from a host device to write data to a first area of a data storage device, detect whether the data storage device is in a first mode indicating a reduced writing reliability relative to a second mode, and write the data to a second area of the data storage device when the first mode is detected, the second area having higher recording reliability than the first area.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 7 illustrates one embodiment of a storage medium using the shingle write method.

FIG. 8(a) and FIG. 8(b) describe restrictions in the case of writing data using the shingle write method.

DETAILED DESCRIPTION OF THE INVENTION

Therefore, an aspect of the detailed description is to provide a method for writing data, while maintaining data reliability even when a write operation is not performed properly due to disturbance, a change in the surrounding environment or the like. Another aspect of the detailed description is to provide a storage device using the write method described above. Exemplary embodiments of the write method according to the technical concept of the present invention and the storage device using the method has an advantage that a write operation can be performed, while maintaining data reliability, by writing data in an area having a lower recording density if the write operation is not performed properly due to disturbance, a change in the surrounding environment or the like. Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

For a full understanding of the invention, operational advantages of the invention, and objects to be achieved by carrying out the invention, reference should not be made to the following detailed description of the exemplary embodiments of the invention as illustrated in the accompanying drawings and those descriptions of the drawings.

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1A:
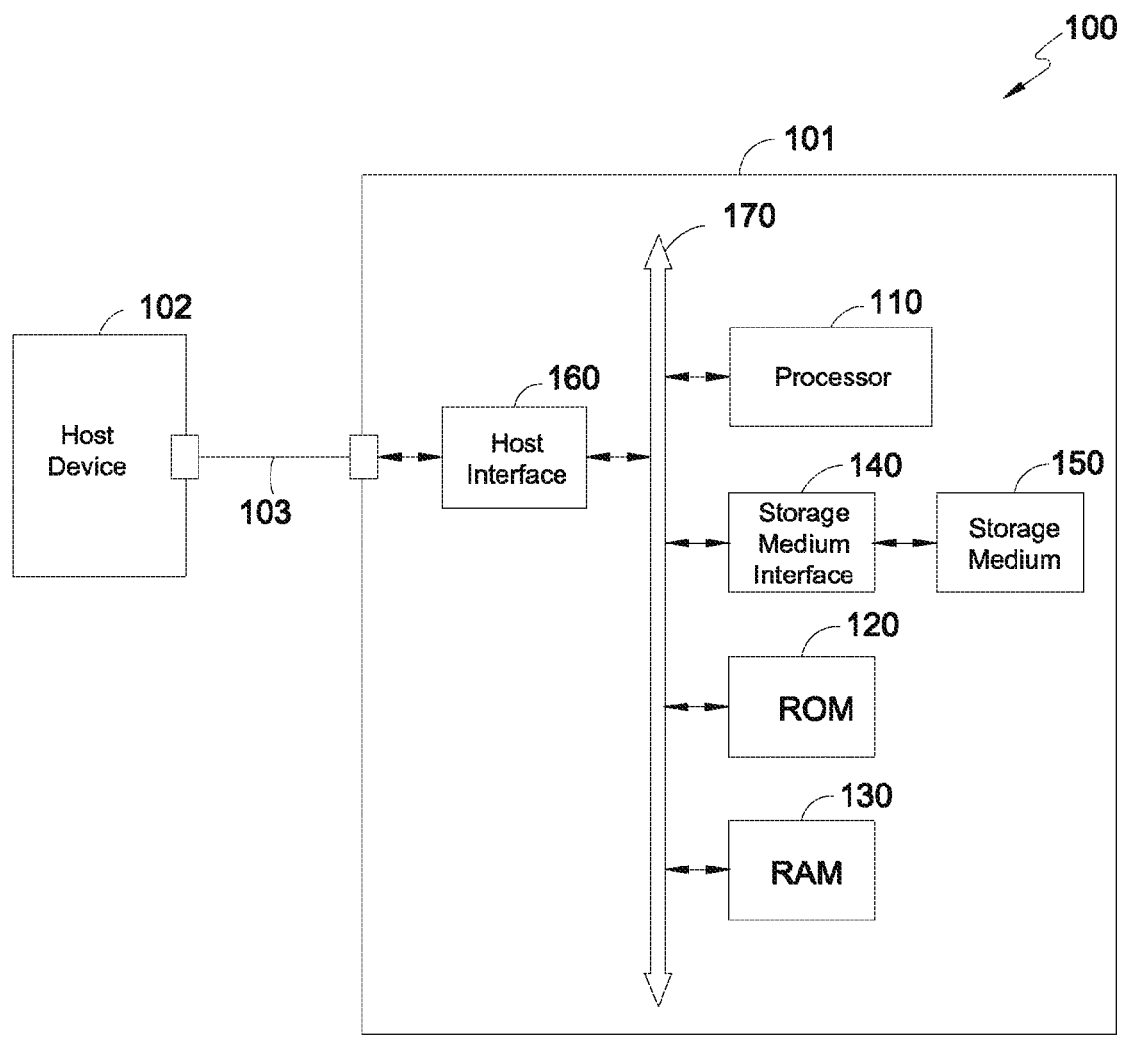
FIG. 1(a) is a block diagram illustrating one embodiment of a computer system according to the technical concept of the present invention.

FIG. 1(a) is a block diagram illustrating one embodiment of a computer system 100 according to the technical concept of the present invention.

As shown in FIG. 1(a), one embodiment of computer system 100 according to the technical concept of the present invention includes a storage device 101, a host device 102 and a connector 103.

In particular, the storage device 101 has a processor 110, a ROM (Read Only Memory) 120, a RAM (Random Access Memory) 130, a storage medium interface 140, a storage medium 150, a host interface 160, and a bus 170.

The host device 102 is adapted to perform a process where the host device issues a command for activating the storage device 101, transmits the command to the storage device 101 connected to the host device via the connector 103, and transmits/receives data to/from the storage device 101 in response to the command having been issued.

The connector 103 is a means for electrically connecting an interface port of the host device 102 with an interface port of the storage device 101, and may include a data connector and a power connector. In one example, if the SATA (Serial Advanced Technology Attachment) interface is used, it is possible to constitute the connector 103 by a 7-pin SATA data connector and a 15-pin SATA power connector.

First, configurational elements of the storage device 101 will be described.

The processor 110 serves to interpret a command, and controls the configurational elements of a data storage device according to the interpretation result. The processor 110 includes a code object management unit which is used to load to the RAM 130 a code object saved in the storage medium 150. The processor 110 loads, to the RAM 130, code objects for executing the write methods of FIGS. 13 through 22.

Then, the processor 110 can execute a task for the write methods of FIGS. 13 through 22, using the code objects loaded to the RAM 130. A method for controlling the write operation to be executed by the processor 110 will be dealt with in detail later in the description of FIGS. 13 though 22 below.

The ROM 120 is adapted to store program codes and data necessary for activating the data storage device. These program codes and data that are saved in the ROM 120 or the storage medium 150 are loaded to the RAM 130 under the control of the processor 110.

The storage medium 150 can include a disc or a non-volatile memory unit as a main storage medium for the storage device. The storage device can include, for instance, a disc drive. The detailed configuration of the head disc assembly 100 including a disc in the disc drive, and a head is illustrated in FIG. 3.

Figure 3:
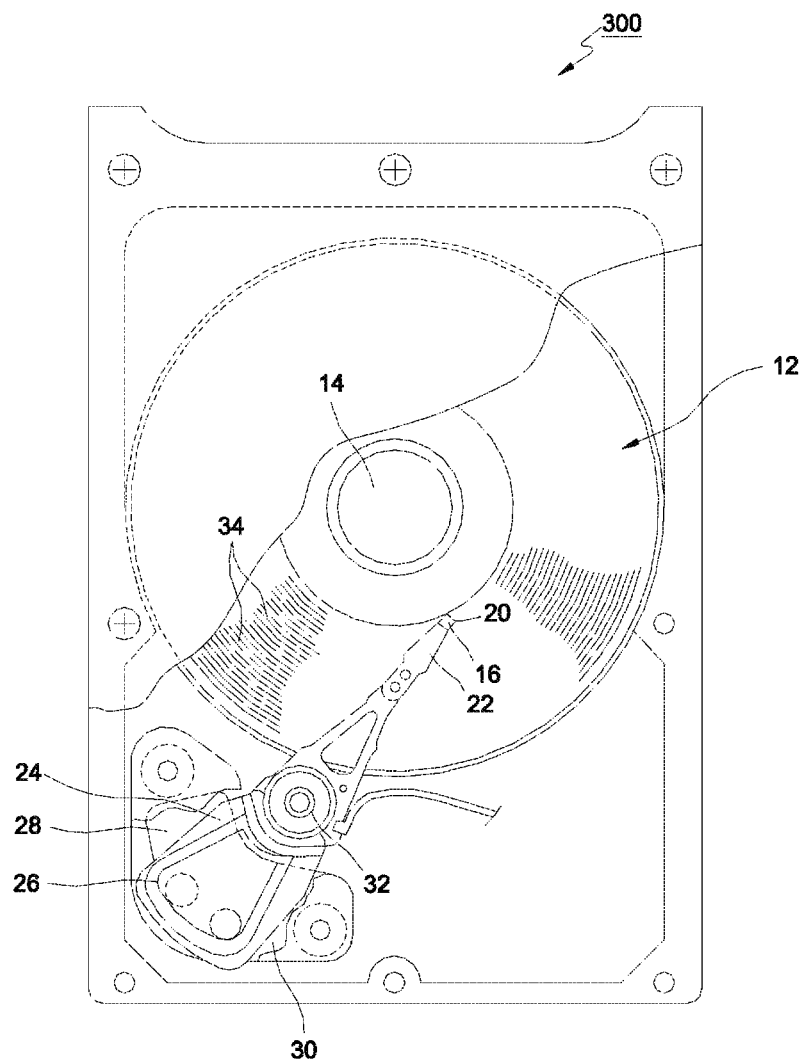
FIG. 3 is a plan view illustrating one embodiment of the head disc assembly of a disc drive according to the technical concept of the present invention.

FIG. 3 is a plan view illustrating one embodiment of a head disc assembly 300 of a disc drive according to the technical concept of the present invention.

As shown in FIG. 3, a head disc assembly 300 includes at least one disc 12 that is rotated by a spindle motor 14. The disc drive further includes a head 16 located close to the surface of disc 12.

The head 16 senses the magnetic field of each disc 12 and magnetizes the disc to be able to read information from or write information on the disc 12 as it rotates. Typically, the head 16 is coupled to the surface of each disc 12. Although a single head 16 is illustrated and described, it should be understood that the head is composed of a writing head for magnetizing the disc 12, and a reading head separated for sensing the magnetic field of the disc 12. The reading head consists of a MR (Magneto-Resistive) element. The head 16 can also be referred to as a magnetic head or a transducer.

The head 16 can be integrated with a slider 20. The slider 20 is adapted to produce an air bearing between the surface of the head 16 and the surface of the disc 12. The slider 20 is integrated with a head gimbal assembly 22. The head gimbal assembly 22 is attached to an actuator arm 24 having a voice coil 26. The voice coil 26 is placed close to a magnetic assembly 28 to define a VCM (Voice Coil Motor) 30. When a current is applied to the voice coil 26, a torque is generated, thereby rotating the actuator arm 24 with respect to a bearing assembly 32. The rotation of the actuator arm 24 causes the head 16 to move across the surface of the disc 12.

In general, information is stored in annular tracks of the disc 12. Each of the tracks 34 includes a plurality of sectors. An exemplary structure of the sector of each track is shown in FIG. 5.

Figure 5:
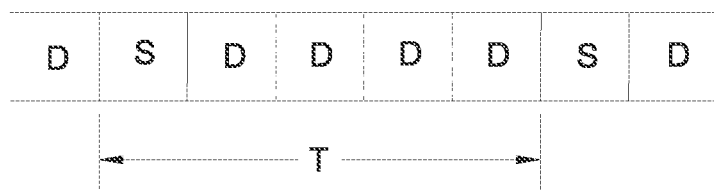
FIG. 5 illustrates the structure of a sector for one track on the disc as one embodiment of a storage medium that can be applied to the present invention.

FIG. 5 illustrates the structure of a sector for one track on the disc as one embodiment of a storage medium that can be applied to the present invention.

As shown in FIG. 5, a servo sector interval T consists of a servo area S and a data area, and the data area can have a plurality of data sectors D. Needless to say, a servo sector interval may have a single data sector D. The data sector D can also be referred to as a sector. To be more specific, signals such as those shown in FIG. 6 are recorded in the servo area S.

Figure 6:
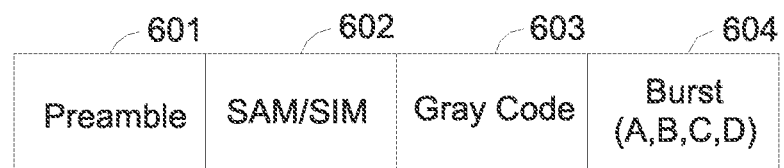
FIG. 6 illustrates the structure of a servo area shown in FIG. 5.

FIG. 6 illustrates the structure of the servo area S shown in FIG. 5.

As shown in FIG. 6, a preamble signal 601, a servo synchronization indication signal 602, a gray code 603 and burst signals 604 are written in the servo area S.

The preamble signal 601 provides clock synchronization during reading of servo information, and provides a uniform timing margin by placing a gap before a servo vector. The preamble signal 601 is used to determine a gain of the AGC (Automatic Gain Control) circuit.

The servo synchronization indication signal 602 consists of a SAM (Servo Address Mark) and a SIM (Servo Index Mark). The SAM is a signal indicating the beginning of a servo sector, and the SIM is a signal indicating the beginning of a first servo sector in a track.

The gray code 603 provides track information. The burst signal 604 is used to control the head 16 to follow the central part of the track 34. For example, the burst signal 604 has four patterns: A, B, C, and D. That is, these four burst patterns are combined to generate a position error signal for use in tracking control.

The disc 12 is divided into a maintenance cylinder area where users cannot access, and a user data area where users can access. The maintenance cylinder area can also be referred to as a system area. The maintenance cylinder area stores all kinds of information needed to control the disc drive, as well as information needed to perform the read and write operation control methods according to the present invention. In particular, the maintenance cylinder area can store a mapping table for converting a LBA (Logical Block Address) into a VA (Virtual Address) on the basis of a virtual zone or a virtual band.

The head 16 moves across the surface of the disc 12 to read information from, or write information on another track. The disc 12 can store a plurality of code objects necessary for performing diverse functions on the disc drive. In one example, the disc 12 can store a code object necessary for performing an MP3 player function, a code object for performing a navigation function, a code object for executing a variety of video games, and so on.

Referring back to FIG. 1, the storage medium interface 140 is adapted to allow the processor 110 to access the storage medium 150 in order to write information thereto, or to read information therefrom. The storage medium interface 140 in a storage device implemented as a disc drive can include a servo circuit for controlling the head disc assembly 300 and a read and write channel circuit for performing signal processing for the read and write operations.

The host interface 160 is a means for transmitting data to, or receiving data from, the host device 102, such as a personal computer, a mobile device or the like. Different types of interfaces, such as SATA (Serial Advanced Technology Attachment) interface, PATA (Parallel Advanced Technology Attachment) interface, and USB (Universal Serial Bus) interface may be used as the host interface.

The bus 170 serves to enable the transfer of information among the configurational elements of the storage device.

A software operating system of a hard disc drive, an example of the storage device, will now be described with reference to FIG. 2. That is, FIG. 2 is a software operating system of the storage device 101 shown in FIG. 1(a) or the storage device 101' shown in FIG. 1(b).

Figure 2:
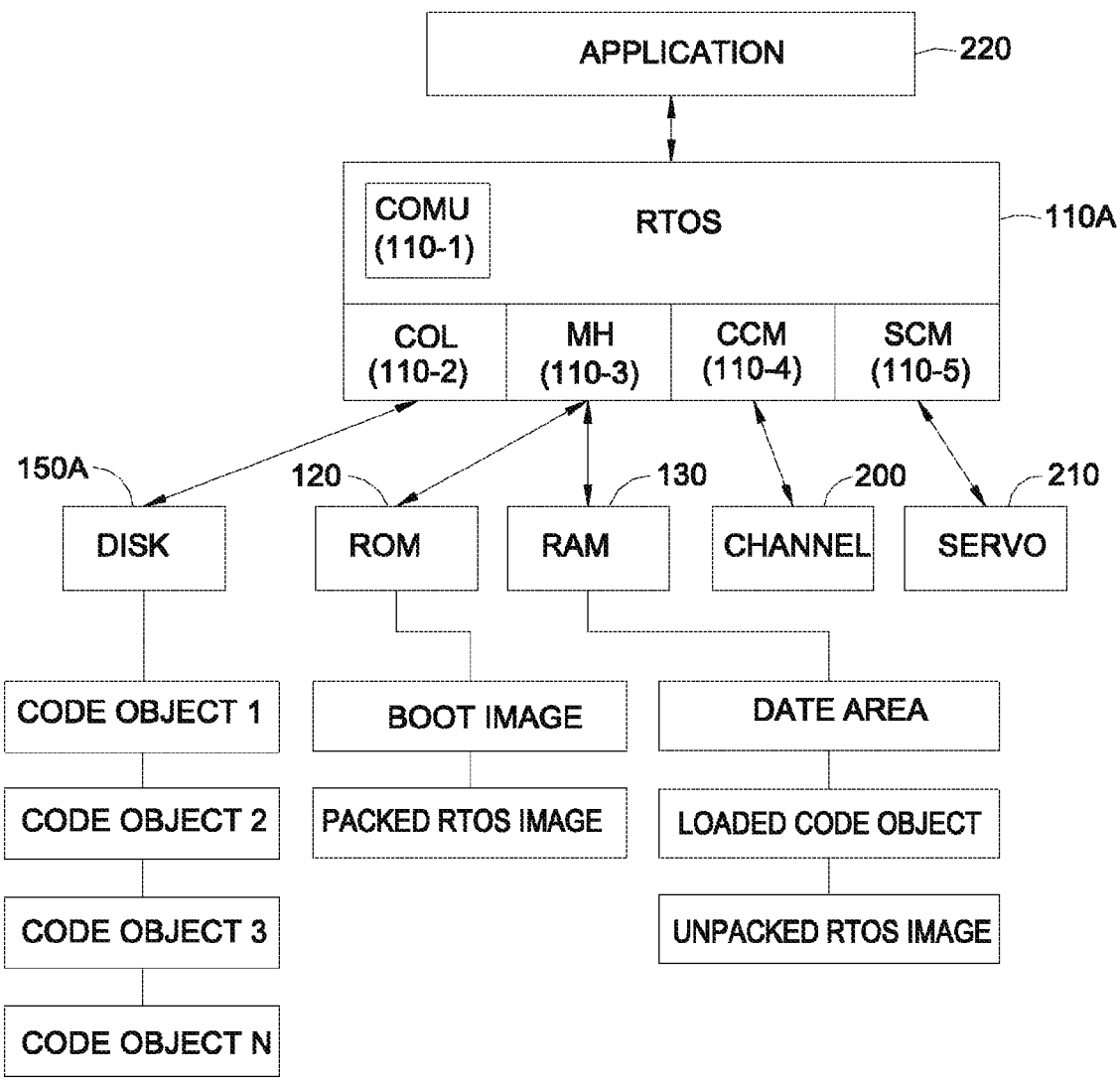
FIG. 2 illustrates a software operating system of the storage device shown in FIG. 1(a) or FIG. 1(b).

As shown in FIG. 2, a disc 150A, which is an HDD (Hard Disc Drive) storage medium stores a plurality of code objects 1 to N.

ROM 120 stores a boot image and a packed RTOS image.

The disc 150A as an HDD storage medium stores the plurality of code objects 1 to N. The code objects stored in the disc 150A may include code objects necessary for the operation of the HDD, as well as code objects related to various functions that may be expanded to the disc drive. In particular, the disc 150A as a HDD storage medium stores code objects necessary for executing the write operation control methods according to the flow charts FIGS. 13 through 22. Needless to say, the ROM 120, instead of the disc 150A as a HDD storage medium, can also store code objects necessary for executing the write methods of FIGS. 13 through 22. Further, the disc can store code objects necessary for performing diverse functions including an MP3 player function, a navigation function, a video game function, and so on.

As to RAM 130, the boot image is read from the ROM 120 during booting and an unpacked RTOS image is then loaded to the RAM 130. Also, code objects that are stored in the disc 150A as an HDD storage medium, the code objects being necessary for performing a host interface, are loaded to the RAM 130. Needless to say, a data area for storing data is assigned to the RAM 130.

Channel circuit 200 has circuits embedded therein, which are needed to perform signal processing for the data read and write operations. Servo circuit 210 has circuits embedded therein, which are needed to control the head disc assembly 300 for performing the data read and write operations.

RTOS (Real Time Operating System) 110A is a real-time multi-program operating system using a disc. In the RTOS 110A, depending on a task, real-time multiplexing is performed in a foreground routine that has a higher priority, while batch processing is performed in a background routine that has a lower priority. Also, the RTOS 110A loads a code object to the disc, and unloads a code object from the disc.

The RTOS 110A performs a task under a given command by managing a COMU (Code Object Management Unit) 110-1, a COL (Code Object Loader) 110-2, an MH (Memory Handler) 110-3, a CCM (Channel Control Module) 110-4, and an SCM (Servo Control Module) 110-5. Further, the RTOS 110A manages application programs 220.

To be more specific, the RTOS 110A loads, to the RAM 130, code objects necessary for controlling the disc drive during booting of the disc drive. Accordingly, after the booting process is executed, the disc drive may be activated using the code objects loaded to the RAM 130.

The COMU 110-1 stores information on locations where the code objects are recorded, and performs bus arbitration. Also, the COMU 110-1 stores information about the priorities of tasks that are being executed, and manages TCB (Task Control Block) information and stack information necessary for performing a task corresponding to a code object used.

The COL 110-2 loads, to the RAM 130, the code objects stored in the disc 150A as an HDD storage medium; or unloads the code objects stored in the RAM 130 to the disc 150A as an HDD storage medium. Accordingly, the COL 110-2 may load, to the RAM 130, the code objects necessary for performing the write methods of FIGS. 13 through 22, which are stored in the disc 150A as an HDD storage medium.

The RTOS 110A may perform the write methods to be described later with reference to FIGS. 13 through 22, using the code objects loaded to the RAM 130.

The MH 110-3 writes data to, or reads data from, the ROM 120 and the RAM 130.

The CCM 110-4 performs the channel control required to perform signal processing for the data read and write operations, and the SCM 110-5 performs the servo control that includes the control of the head disc assembly in order to perform the data read and write operations.

FIG. 1(*b*) is a block diagram illustrating another embodiment of a computer system 100' according to the technical concept of the present invention.

A storage device 101' of the computer system 100' as shown in FIG. 1(*b*) further includes a non-volatile memory unit 180, in addition to those in the storage device 101 shown in FIG. 1(*a*). The storage medium 150 as in FIG. 1(*b*) can be implemented as a disc.

The non-volatile memory unit 180 can be implemented as a non-volatile semiconductor memory unit, such as, a flash memory, PRAM (Phase change RAM), FRAM (Ferroelectric RAM), MRAM (Magnetic RAM), or the like.

The non-volatile memory unit 180 can store part or all of the data to be stored in the storage device 101'. In an example, all kinds of information necessary for the control of the storage device 101' may be stored in the non-volatile memory unit 180.

Also, the non-volatile memory unit 180 can store program codes and information for executing the write methods described in FIGS. 13 through 22. Moreover, the non-volatile memory unit 180 can store code objects necessary for performing diverse functions of the storage device. When a mapping table is stored in the non-volatile memory unit 180, the storage device may load the mapping table stored in the non-volatile memory unit 180, to the RAM 130.

Those same configurational elements as in the computer system of FIG. 1(*a*) will not be described here to avoid repetition.

FIG. 4(*a*) illustrates an electrical circuit configuration of a disc drive 400 as one embodiment of the storage device 101 in FIG. 1(*a*).

As shown in FIG. 4(*a*), one embodiment of the disc drive 400 according to the technical concept of the present invention includes a preamplifier 410, a read/write (R/W) channel 420, a processor 430, a VCM (Voice Coil Motor) driver 440, an SPM (Spindle Motor) driver 450, a ROM 460, a RAM 470, and a host interface 480.

The processor 430 may be a DSP (Digital Signal Processor), a microprocessor, or a microcontroller. In response to a command received from the host device 102 via the host interface 480, the processor 430 controls the R/W channel 420 to read information from, or write information to the disc 12.

The processor 430 is coupled to the VCM driver 440 that supplies a driving current for driving a VCM 30. The processor 430 provides a control signal to the VCM driver 440 in order to control the movement of a head 16. The processor 430 is also coupled to the SPM driver 450 that supplies a driving current for driving an SPM (Spindle Motor) 14. When power is supplied to the processor 430, the processor 430 provides a control signal to the SPM driver 450 in order to rotate the SPM 14 at a desired speed.

The processor 430 is coupled to the ROM 460 and the RAM 470, respectively. The ROM 460 stores firmware and control data for controlling the disc drive. The program codes and information necessary for executing the write methods described in FIGS. 13 through 22 may be stored in the ROM 460. Needless to say, these program codes and information necessary for executing the write methods described in FIGS. 13 through 22 may be stored in the maintenance cylinder area of the disc 12 or the non-volatile memory unit 490 (described in regards to FIG. 4(*b*), below), instead of the ROM 460.

In the RAM 470, the program codes and information stored in the ROM 460 or the disc 12 are loaded in the initial mode under the control of the processor 430, and the data received via the host interface 480 or the data read from the disc 12 is temporarily stored.

The RAM 470 may be implemented as a DRAM or SRAM. In addition, the RAM 470 may be designed such that it may be driven in a SDR (Single Data Rate) or DDR (Double Data Rate) manner.

The processor 430 can control the disc drive to execute the write methods described in FIGS. 13 through 22, using the program codes and information stored in the ROM 460 or the maintenance cylinder area of the disc 12.

FIG. 4(*b*) illustrates an electrical circuit configuration of a disc drive 400' as one embodiment of the storage device 101' in FIG. 1(*b*).

The disc drive 400' as shown in FIG. 4(*b*) further includes a non-volatile memory unit 490, as compared with the disc drive 400 shown in FIG. 4(*a*). The non-volatile memory unit 490 can store part of the data to be stored in the storage device 400'. In an example, all kinds of information necessary for the control of the storage device 400' may be stored in the non-volatile memory unit 490.

Also, the non-volatile memory unit 490 can store program codes and information for executing the write methods described in FIGS. 13 through 22. Moreover, the non-volatile memory unit 490 can store code objects necessary for performing diverse functions of the storage device.

The processor 430 is coupled to the ROM 460, the RAM 470, and the non-volatile memory unit 490, respectively. The ROM 460 stores firmware and control data for controlling the disc drive. The program codes and information necessary for executing the write methods described in FIGS. 13 through 22 may be stored in the ROM 460. Needless to say, these program codes and information necessary for executing the write methods described in FIGS. 13 through 22 may be stored in the maintenance cylinder area of the disc 12, instead of the ROM 460.

In the RAM 470, the program codes stored in the ROM 460, the disc 12, or the non-volatile memory unit 490 are loaded in the initial mode under the control of the processor 430.

Those same configurational elements as in the disc drive 400 of FIG. 4(*a*) will not be described here to avoid repetition.

The following will now describe the data read and write operations of the disc drive, with reference to FIG. 4(*a*) or FIG. 4(*b*).

In data read mode, the disc drive amplifies, by means of the preamplifier 410, an electrical signal which is sensed from the disc 12 by the head 16. Then, in the R/W channel 420, a signal outputted from the preamplifier 410 is amplified by an automatic gain control circuit (not shown in the drawing) that automatically varies a gain according to the amplitude of the signal, converted into a digital signal and then decoded, thereby detecting data. The processor 430 executes an error correction process using, for example, a Reed Solomon code, which is an error correcting code; transforms the data into stream data; and then transmits the stream data to the host device 102 via the host interface 480.

In data write mode, the disc drive receives data from the host device via the host interface 480. Then, the processor 430 adds an error correcting symbol based on a Reed Solomon code to the data, and the R/W channel 420 encodes the data suitable for a write channel. This encoded data is then recorded on the disc 12 via the head 16 using a write current that has been amplified by the preamplifier 410.

The following will now describe the write methods described in FIGS. 13 through 22, which are executed in the processor 430 using the program codes and information loaded to the RAM 470.

First, a shingle write method, which is a new write method proposed to increase the recording density of a disc drive as one of storage devices according to one embodiment of the present invention will be described. In a write method such as the shingle write method, tracks of a disc are overlapped with each other like roof tiles, and a write operation is performed consecutively only in one direction.

FIG. 7 illustrates one embodiment of a storage medium using the shingle write method.

As shown in FIG. 7, a storage medium includes X (X is a natural number) zones ZONE 1-ZONE X, and each zone has Y (Y is a natural number) virtual bands BAND 1-BAND Y. Each virtual band includes a plurality of tracks, each of which can have a plurality of data sectors (not shown). For instance, in the case of FIG. 7, a virtual band BAND 1 may include Z (Z is a natural number) tracks, and a virtual band BAND 2 may include J (J is a natural number) tracks. Each zone may include the same number of virtual bands, or a different number of virtual bands. Also, each track may have the same number of sectors, or a different number of sectors.

Data can be written consecutively on the tracks included in each of the virtual bands BAND 1-BAND Y, based on the shingle write method. For instance, data that is written on the TRACK 2 may be overwritten in some areas of the TRACK 1, data that is written on the TRACK 3 may be overwritten in some areas of the TRACK 2, and data that is written on the TRACK Z may be overwritten in some areas of the TRACK Z−1. Thus, a storage medium having such a structure as shown in FIG. 7 can increase a TPI (Track Per Inch) value, which is a recording density in the radial direction. However, data that is written on the TRACK Z+1, i.e. the first track of the virtual band BAND 2, is not overwritten on the TRACK Z, i.e. the last track of the virtual band BAND 1. As such, in the shingle write method, data that is written on the first track of each of the virtual bands is not overwritten on the last track of the previous virtual band. Reference numerals 710 and 720 in FIG. 7 denote overwritten areas.

Meanwhile, write target data that is received can be consecutively written on the tracks of a corresponding virtual band. For example, write target data that is received first to be written on the virtual band BAND 1 is written on the first data sector of the TRACK 1, and data that is received later on is written consecutively in a following data sector that comes after the data sector already written with the data. If data is written in all of the data sections of one track, data can be written consecutively beginning in the first data sector out of the data sectors of the next adjacent track, starting from the first data sector to the last data sector thereof. When a read command is received later, a new disc address for an LBA (Logical Block Address) of each of the received data can be dynamically assigned such that a read operation can be performed.

For simplicity's sake, all tracks shown in FIG. 7 have the same length. However, when data is written in the form of a concentric circle on a platter, e.g., a hard disk as a storage media, each track can have a different length. Accordingly, when a disc such as a hard disc is used as the storage medium, the outer track may have a larger number of sectors than the inner track.

The storage medium on which data can be shingle written as in FIG. 7 is not particularly limited, and the shingle write method can be applied to any case where data is written on a storage medium having tracks.

Figure 8B:
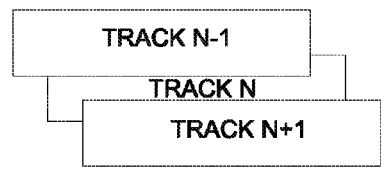

FIGS. 8(a) and 8(b) are provided to describe restrictions that can be posed when data is written based on the shingle write method.

Referring to FIG. 8(a), when data is shingle written on a storage medium having the structure shown in FIG. 8(a) in the arrow direction, a flux is generated only in the arrow direction. Therefore, after data is written on a TRACK N, it should be noted that the TRACK N−1 is not available for writing. If, as shown in FIG. 8(b), data is written on the TRACK N−1 in the opposite direction of the shingle write direction after data is written on the track N, the data having been written on the TRACK N can be erased by an ATI (Adjacent Track Interference).

Therefore, in order to solve the problems described above, there is a need to develop a technique that dynamically assigns a new disc address for the LBA provided from the host such that a write operation can always be performed consecutively in only one direction, that is, either in the inward radial direction of the disc or in the outward radial direction of the disc.

In the following description, it is assumed that a VA (virtual address) may be used when the LBA is transformed into a CHS (Cylinder Head Sector), which is a PBA (Physical Block Address) of the disc drive. That is, with one embodiment according to the technical concept of the present invention, mapping information of the LBA and the VA can be used to write data, or to read data having been stored.

Figure 1B:
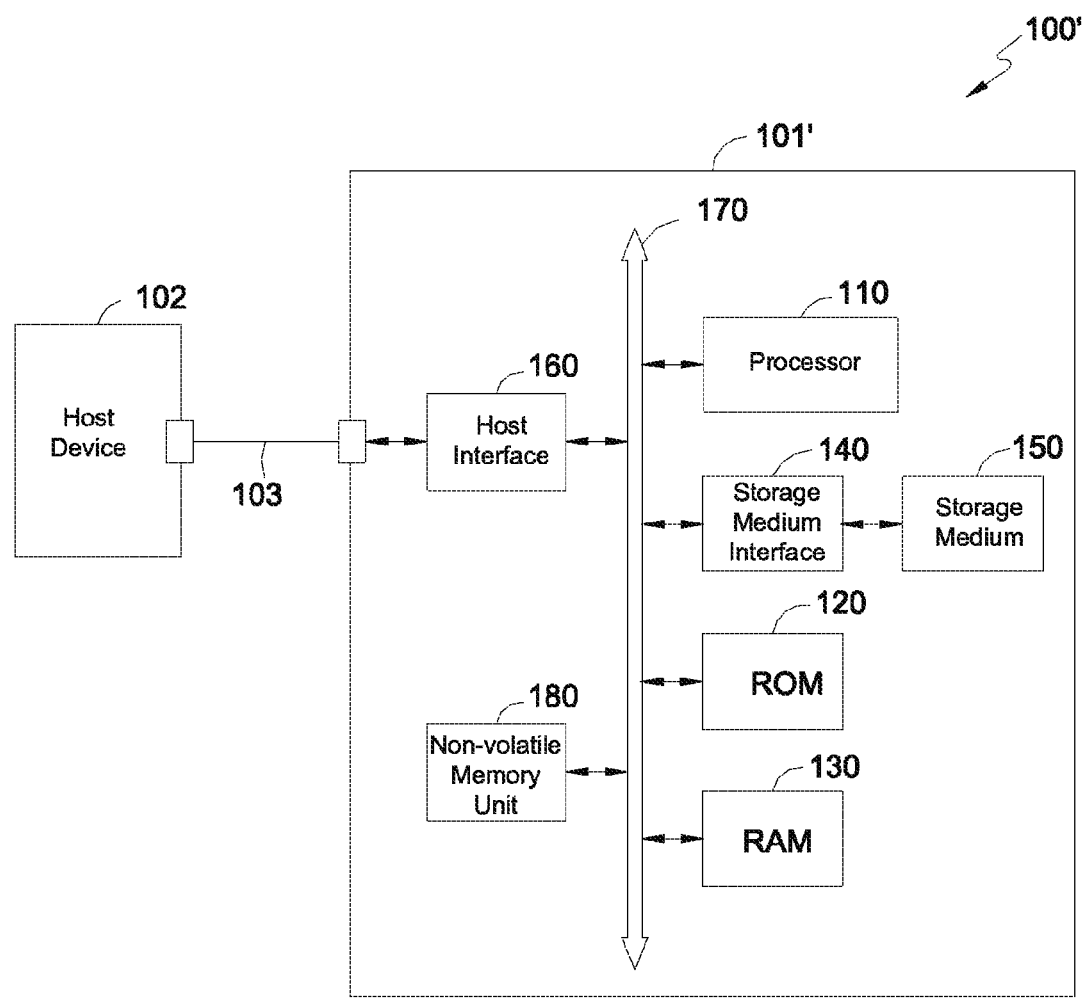
FIG. 1(b) is a block diagram illustrating another embodiment of a computer system according to the technical concept of the present invention.
Figure 4A:
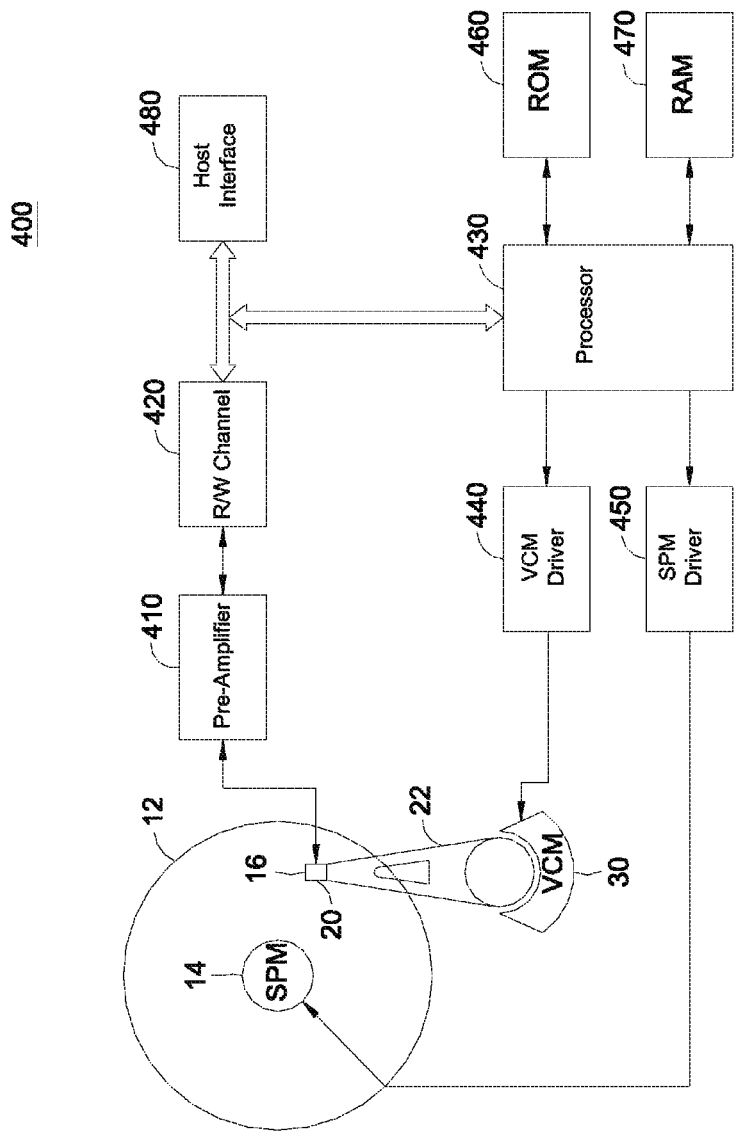
FIG. 4(a) illustrates an electrical circuit configuration of the disc drive as one embodiment of the storage device in FIG. 1(a).
Figure 4B:
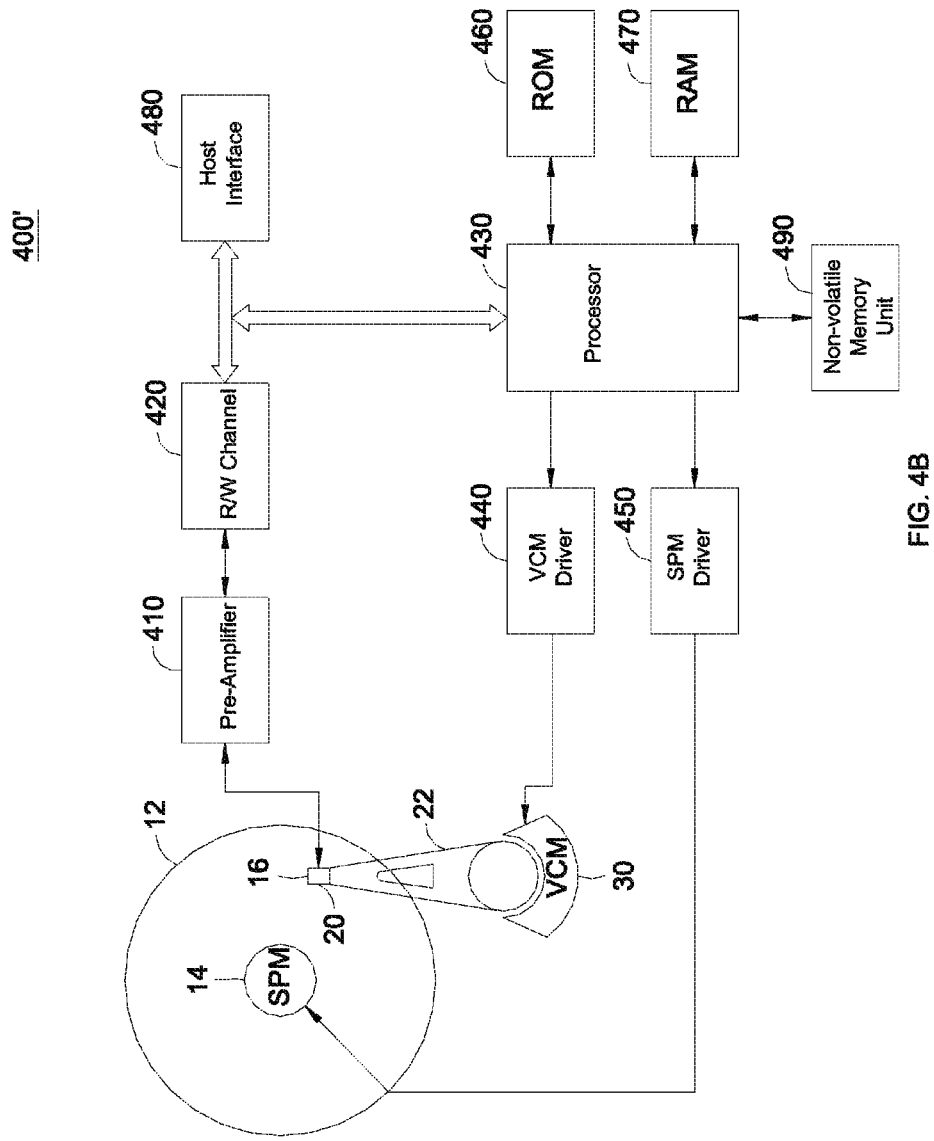
FIG. 4(b) illustrates an electrical circuit configuration of the disc drive as one embodiment of the storage device in FIG. 1(b).
Figure 9:
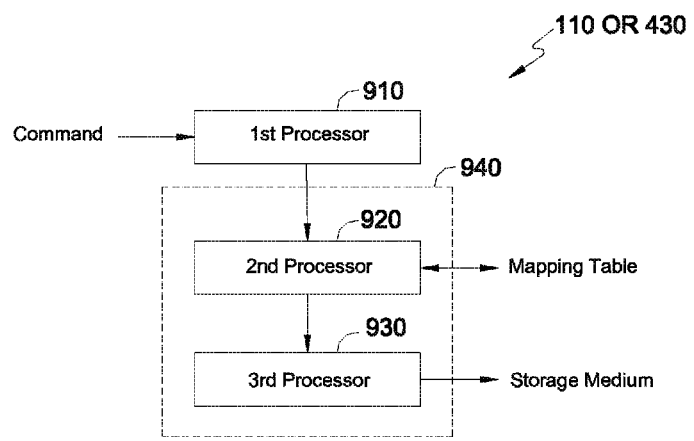
FIG. 9 illustrates one embodiment of a processor shown in FIG. 1(a) or FIG. 1(b), or a processor shown in FIG. 4(a) or FIG. 4(b).

FIG. 9 illustrates one embodiment of the processor 110 shown in FIGS. 1(a) and 1(b), or the processor 430 shown in FIGS. 4(a) and 4(b).

Figure 10:
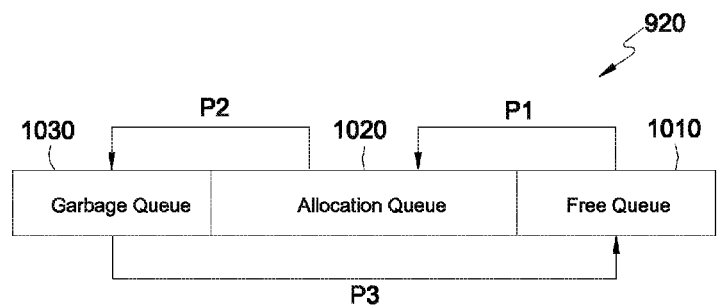
FIG. 10 illustrates one embodiment of a second processor shown in FIG. 9.

FIG. 10 illustrates one embodiment of a second processor 920 shown in FIG. 9.

As shown in FIGS. 1(a), 1(b), 4(a), 4(b) and 9, the processor 110 or 430 may include a first processor 910, a second processor 920, and a third processor 930. In this case, the second processor 920 and the third processor 930 may be designed in an integrated form, i.e. a processor 940. Needless to say, although not shown in the drawings, the first processor 910 and the second processor 920 can also be designed in one integrated processor.

The first processor 910 receives a command and extracts a logical block address designated by the command.

The second processor 920 transforms the logical block address having been extracted by the first processor 910 into a virtual address. That is, the second processor 920 can transform the logical block address into the virtual address, using a mapping table. The mapping table can include mapping information between the logical block address and the virtual address. The mapping table may be stored in an information storage device 1100 in FIG. 11.

As shown in FIGS. 9 and 10, the second processor 920 may include a free queue 1010, an allocation queue 1020, and a garbage queue 1030. The second processor 920 uses the free queue 1010, allocation queue 1020 and garbage queue 1030 to transform the LBA designated by the command received into the virtual address.

The second processor 920 stores information about virtual bands, which are not assigned to logical bands, in the free queue 1010 sequentially following those given rules. For example, the virtual band that is not assigned to a logical band may denote a virtual band that does not include any data sector having valid data. The free queue 1010 is a stand-by means, in which virtual band information that can be assigned to logical bands by a command is stored until it is selected. In the free queue 1010, virtual band information that can be assigned to logical bands is classified and saved by virtual zone or physical zone.

The second processor 920 stores information about virtual bands that are assigned to logical bands in the allocation queue 1020. For instance, when the mapping table does not include a virtual band assigned to a logical band including the logical block address that is designated by the command received, or when every virtual address is already assigned and used up in a virtual band assigned to a logical band including the logical block address that is designated by the command received, the second processor 920 selects one of virtual bands standing by in the free queue 1010, assigns the selected virtual band to a logical band including the logical block address that is designated by the command received, and moves it to the allocation queue 1020 (P1).

Next, the second processor 920 assigns a corresponding virtual address to the logical block address that is designated by the command received, on the basis of the virtual band assigned to the logical band that is stored in the allocation queue 1020. To be more specific, when a new virtual address is assigned to a logical band including the logical block address that is designated by the command received and then saved in the allocation queue 1020, the second processor 920 assigns a virtual address, which corresponds to the first data sector of the newly assigned logical band, to the logical block address that is designated by the command received.

Also, when a virtual band already assigned to a logical band including the logical block address that is designated by the command received is present in the allocation queue 1020, the second processor 920 assigns a virtual address, which is not assigned in the corresponding virtual band, to the logical block address that is designated by the command received. For instance, the second processor 920 can assign a virtual address for a data sector to the logical block address that is designated by the command received, the data sector coming right next to the data sector that was accessed for the last time in the virtual band already assigned to a logical band including the logical block address.

The second processor 920 selects a virtual band among those virtual bands assigned to the logical band, the selected virtual band having a greater number of invalid virtual addresses than a threshold as a result of the data update, and then moves this selected virtual band to the garbage queue 1030 (P2).

Also, if the number of virtual bands stored in the free queue 1010 is less than an initially set minimum value, the second processor 920 performs a garbage collection process. That is, the second processor 920 reads data from the virtual bands stored in the garbage queue 1030, the data being stored in the sectors of the valid virtual addresses, and executes a rewrite in a virtual address that is designated by a newly assigned virtual band from the free queue 1010.

The second processor 920 moves information about the virtual band that has performed a rewrite among those virtual bands stored in the garbage queue 1030, to the free queue 1010 (P3). In this case, the virtual band that has performed the rewrite does not have valid data, and all of its stored data are invalid data.

Then, the third processor 930 transforms the virtual address, which has been transformed in the second processor 920, into a physical block address of a disc, and controls the storage device to access a storage medium according to the transformed physical block address. That is, the third processor 930 transforms the virtual address into CHS (Cylinder Head Sector) information that indicates the physical location of the disc, and generates a voice coil motor driving control signal for accessing the disc based on the transformed CHS information.

As shown in FIG. 4(a) or FIG. 4(b), when the voice coil motor driving control signal generated in the third processor 930 is applied to the VCM driver 440, the VCM driver 440 generates a voice coil motor driving current corresponding to the voice coil motor driving control signal and supplies the current to the voice coil motor 30. Accordingly, the magnetic head 16 moves to a target access track location of the disc such that it can perform the data write or data read operation according to the command.

Figure 11:
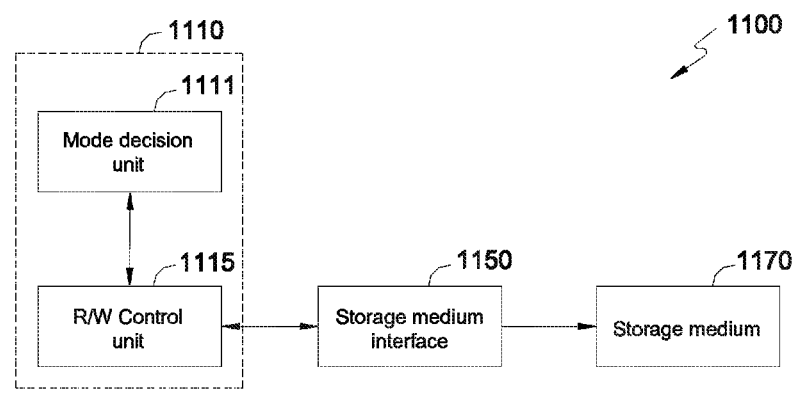
FIG. 11 is a block diagram illustrating one embodiment of a storage device according to the technical concept of the present invention.

FIG. 11 is a block diagram illustrating one embodiment of a storage device 1100 according to the technical concept of the present invention.

As shown in FIG. 11, the storage device 1100 can include a processor 1110, a storage medium interface 1150, and a storage medium 1170.

The storage medium 1170 can include at least one first area and at least one second area. The second area has a lower recording density than that of the first area. For example, when the storage medium 1170 is a disc, the first area and the second area each can have at least one track, and the second area can have a lower TPI (Track Per Inch) or BPI (Bit Per Inch) than that of the first area. Also, even if the first area and the second area have the same TPI or BPI, in the case of writing data, the data is written on the tracks of the second area having a smaller number of tracks than that of the first area such that the recording density of the second area may be lower than that of the first area. For instance, when the first area and the second area have the same number of tracks, it is possible to write data on every track in the first area, while every other track in the second area. In this case, if data is written on every track in both the first area and the second area, the amount of data written in the second area is half of the amount of data written in the first area. Thus, one can say that the recording density of the second area is lower than that of the first area.

For example, when the storage medium 1170 is a disc, each of the first area and the second area can be a zone including a plurality of tracks. Also, each of the first area and the second area can be one of the virtual bands BAND 1-BAND Y or one of zones ZONE 1-ZONE X in FIG. 7. That is, in each of the first area and the second area, data can be recorded based on the shingle write method described above, or data can be recorded based on the normal write method. The embodiment of the storage medium 1170 will now be described in detail, with reference to FIG. 12.

In response to a control signal of the processor 1110, the storage medium interface 1150 writes the received data in the first area or the second area of the storage medium 1170, or reads the stored data from the first area or the second area of the storage medium 1170.

For instance, when the storage device 1100 in FIG. 11 is a hard disc drive 400 as in FIG. 4(a) or FIG. 4(b), the storage medium interface 1150 may correspond to a device including a head 16 that controls a data read or write operation, and the storage medium 170 may correspond to the disc 12.

The processor 1110 in FIG. 11 can be a processor 110 as in FIG. 1(a) or FIG. 1(b), or a processor 430 as in FIG. 4(a) or FIG. 4(b). The processor 1110 can include a mode decision unit 1111 and a R/W control unit 1115. The mode decision unit 1111 can decide whether the storage device 1110 is operated in the normal mode or in the abnormal mode. Suppose that a write command for writing data in the first area is received. In this case, the normal mode is where it is possible to write the received data normally in the first area, and the abnormal mode is where it is impossible to write the received data normally in the first area. In an example, the mode decision unit 1111 can decide whether it is the abnormal mode, depending on the level of disturbance occurred, or the level of a change in the surrounding environment such as temperature, pressure and humidity. Even when a data write operation is not done normally because of an error caused during the data write operation in the first area, the mode decision unit 1111 can decide such an incidence as the abnormal mode. Other embodiments of deciding the abnormal mode by the mode decision unit 1111 will be described in further detail, with reference to FIGS. 13 through 20.

In response to the decision result made by the mode decision unit 1111, the R/W control unit 1115 may control the storage medium interface 1150 such that the received data is written in the first area or the second area. Suppose that a write command for writing data in the first area is received. If the storage medium is determined to be in the normal mode by the mode decision unit 1111, the R/W control unit 1115 may control the storage medium interface 1150 such that the received data can be written in the first area. Meanwhile, if the storage medium is determined to be the abnormal mode by the mode decision unit 1111, the R/W control unit 1115 may control the storage medium interface 1150 such that the received data can be written in the second area. When the received data needs to be written in the second area, the R/W control unit 1115 may determine whether there is at least one data sector in the second area available for writing the received data, and then control the storage medium interface 1150 such that the received data can be written in the second area or in the first area. The operation of the R/W control unit 1115 in terms of making a decision whether there is at least one data sector in the second area available for writing the received data so as to control the storage medium interface 1150 accordingly will be described in further detail, with reference to FIGS. 13 through 20.

Although not shown in FIG. 11, the processor 1110 may include a mapping management unit for managing mapping information of the written data, and the storage device 1100 may include an information storage device for storing mapping tables with mapping information stored therein. When each of the first area and the second area is a virtual band or zone in FIG. 7, the mapping management unit can create mapping information, which includes information between the logical band and the virtual band, e.g., logical block addresses of target write data, and information about virtual addresses corresponding to the logical block addresses of the target write data and to the data sectors where the data is written. For instance, when the storage device 1100 in FIG. 11 is a hard disc drive 400 as in FIG. 4(a) or FIG. 4(b), the information storage device can be included in the disc 12 or the ROM 460.

When the abnormal mode is changed to the normal mode after the data is written in the second area in the abnormal mode, the R/W control unit 1115 can read the data written in the second area, write the read data in the first area, and delete the data written in the first area from the second area. These operations can be carried out when the storage device 1100 is in an idle state.

With one embodiment according to the technical concept of the present invention, in the abnormal mode, data is written in the second area having a lower recording density than that of the first area such that it is possible to reduce errors that might occur when data is written in the first area in the abnormal mode.

Figure 12:
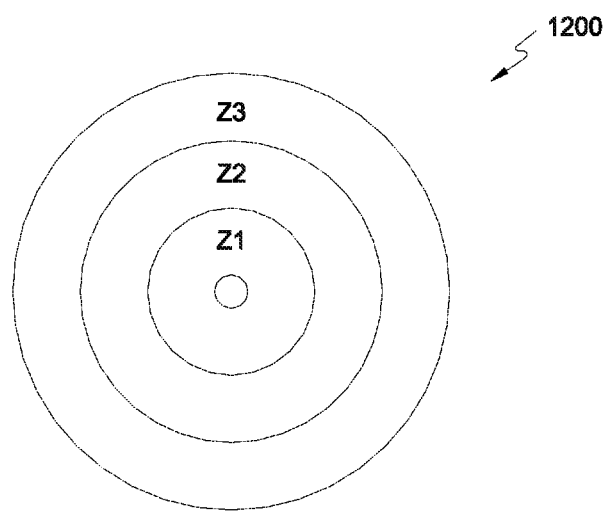
FIG. 12 illustrates one embodiment of the storage medium shown in FIG. 11.

FIG. 12 illustrates one embodiment of the storage medium 1170 in FIG. 11. FIG. 12 illustrates a case where the storage medium 1170 in FIG. 11 is a disc. However, the present invention is not particularly limited thereto, and any storage medium 1170 that can store data and have a first area and a second area with a different recording density can be incorporated into the present invention.

As shown in FIGS. 11 and 12, a disc 1200 may include a plurality of zones Z1, Z2 and Z3. Although FIG. 12 illustrates a disc 1200 having three zones Z1, Z2 and Z3 for simplicity's sake, the present invention is not particularly limited thereto. Rather, the disc 1200 can include a plurality of zones. Also, as explained above in connection with FIG. 11, each of the zones Z1, Z2 and Z3 in FIG. 12 can be a virtual band in FIG. 7.

In one embodiment according to the technical concept of the present invention, the disc 1200 may include at least one of the first area and at least one of the second area. In this case, a zone in the inward direction ID (sometimes called "inner diameter") or in the outward direction OD (sometimes called "outer diameter") can be used when needed as the second area. For example, when a zone in the inward direction ID is supposed to be used as the second area, the zone Z1 can become the second area, and the other zones Z2 and Z3 can become the first area. When a zone in the outward direction OD is supposed to be used as the second area, the zone Z3 can become the second area, and the other zones Z1 and Z2 can become the first area. When a zone between the outward direction OD and the inward direction ID is supposed to be used as the second area, the zone Z2 can become the second area, and the other zones Z1 and Z3 can become the first area. As described in connection with FIG. 11 above, since the second area has a lower TPI or BPI than that of the first area, its recording density can be lower.

Figure 13:
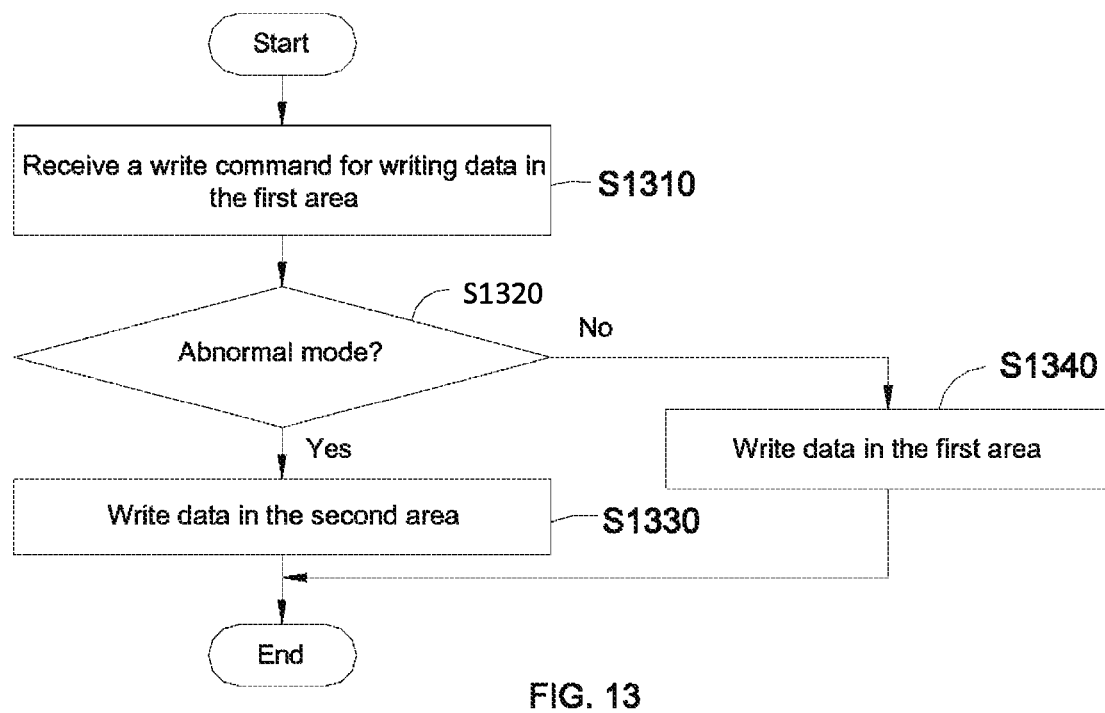
FIG. 13 is a flow chart describing one embodiment of a write method according to the technical concept of the present invention.

FIG. 13 is a flow chart describing one embodiment of the write method according to the technical concept of the present invention.

Referring to FIGS. 11 and 13, when a write command for writing received data in the first area (S1310), the mode decision unit 1111 can decide whether the storage medium is in the normal mode or the abnormal mode (S1320). If the mode decision unit 1111 decides that the storage medium is in the abnormal mode, the R/W control unit 1115 can control the storage medium interface 1150 such that the received data is written in the second area (S1330). If the mode decision unit 1111 decides that the storage medium is in the normal mode, the R/W control unit 1115 can control the storage medium interface 1150 such that the received data is written in the first area (S1340).

More specific embodiments of the present invention will now be described in further detail, with reference to FIGS. 14 through 22.

Figure 14:
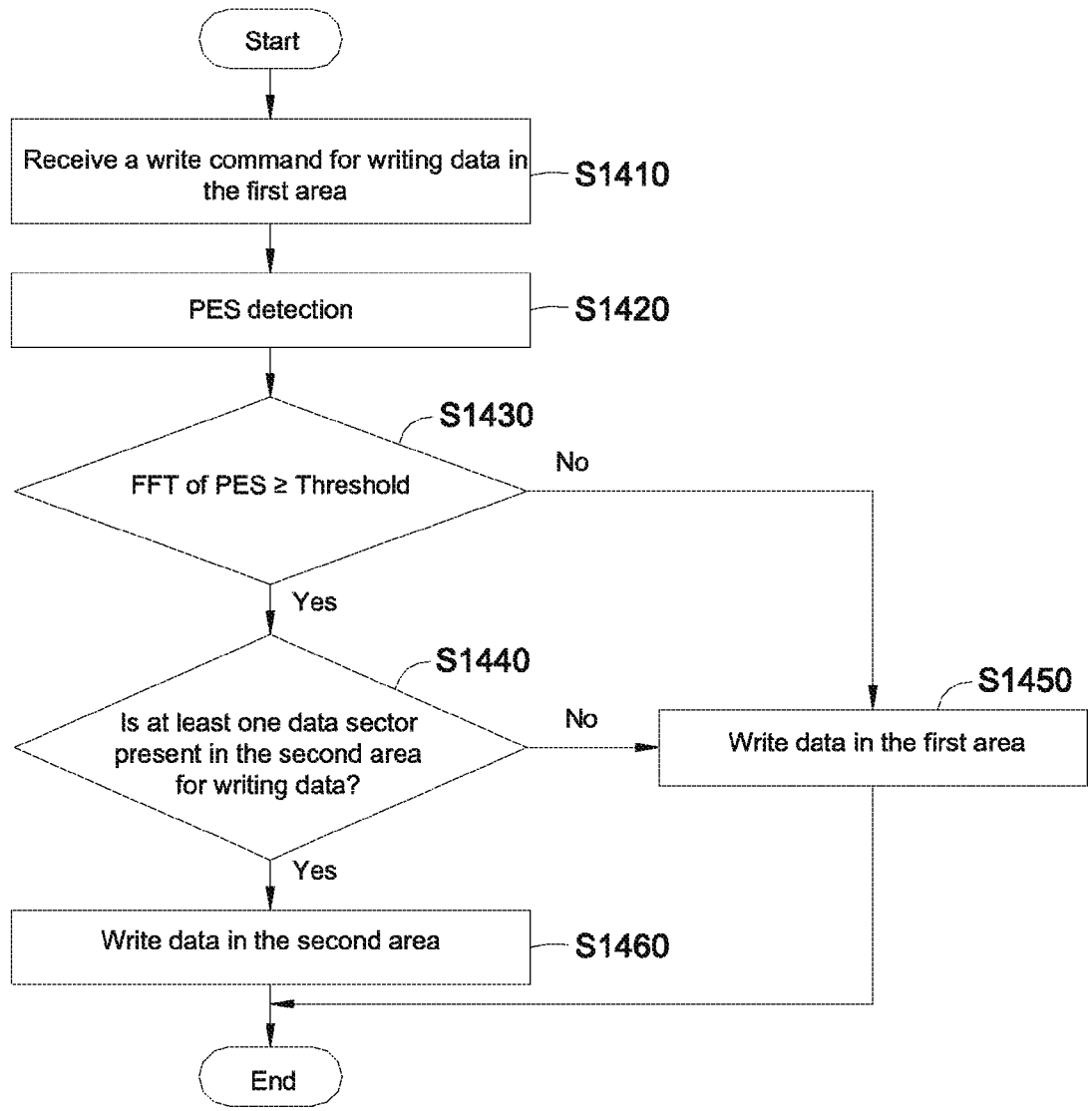
FIG. 14 is a flow chart describing another embodiment of a write method according to the technical concept of the present invention.

FIG. 14 is a flow chart describing one embodiment of the write method according to the technical concept of the present invention.

In this embodiment of FIG. 14, a PES (Position Error Signal) is used to check the occurrence of disturbance so as to decide whether the storage medium is in the normal mode or the abnormal mode. As shown in FIGS. 11 and 14, when a write command for writing data in the first area is received (S1410), the mode decision unit 1111 can detect a position error signal (S1420) and decide whether the storage medium is in the normal mode or the abnormal mode using the detected position error signal. In an example, the mode decision unit 1111 may compare an FFT (Fast Fourier Transform) value of the detected position error signal with a threshold (S1430). A lower threshold indicates that the storage device 1100 operates faster but provides lower reliability, and a higher threshold indicates that the storage device 1100 operates slower but provides higher reliability. Therefore, the threshold is preferably determined to have a suitable value.

If the FFT value of the detected position error signal is less than the threshold, the mode decision unit 1111 may decide that the storage medium is in the normal mode. When the mode decision unit 1111 decides that the storage medium is in the normal mode, the R/W control unit 1115 can write the received data in the first area (S1450).

If the FFT value of the detected position error signal is not less than the threshold, the mode decision unit 1111 can decide that the storage medium is in the abnormal mode. When the mode decision unit 1111 decides that the storage medium is in the abnormal mode, the R/W control unit 1115 may check whether the second area has a space available for writing the received data (S1440). If the second area has a space available for writing the received data, the R/W control unit 1115 can write the received data in the second area (S1460). However, if there is no space in the second area available for writing the received data, the R/W control unit 1115 can write the received data in the first area (S1450).

Although not shown in FIG. 14, it should be understood that if the FFT value of the detected position error signal has turned out to be less than the threshold in step 1430, or if it turned out that the second area does not have a space available for writing the received data in step 1440, step 1430 may be performed again without performing step 1450. That is, if the FFT value of the detected position error signal has turned out to be less than the threshold in step 1430, or if it turned out that the second area does not have a space available for writing the received data in step 1440, the R/W control unit 1115 can control the storage medium interface 1150 not to perform a write operation but to remain in the standby mode until the FFT value of the detected position error signal becomes equal to or greater than the threshold in step 1430, or until the second area has a space available such that the received data can be written therein in step 1440.

In short, the embodiment in FIG. 14 provides a way for performing a write operation while maintaining data reliability, by writing the received data in the second area if the level of disturbance obtained by using the position error signal indicates that it is not appropriate to perform the write operation.

Figure 15:
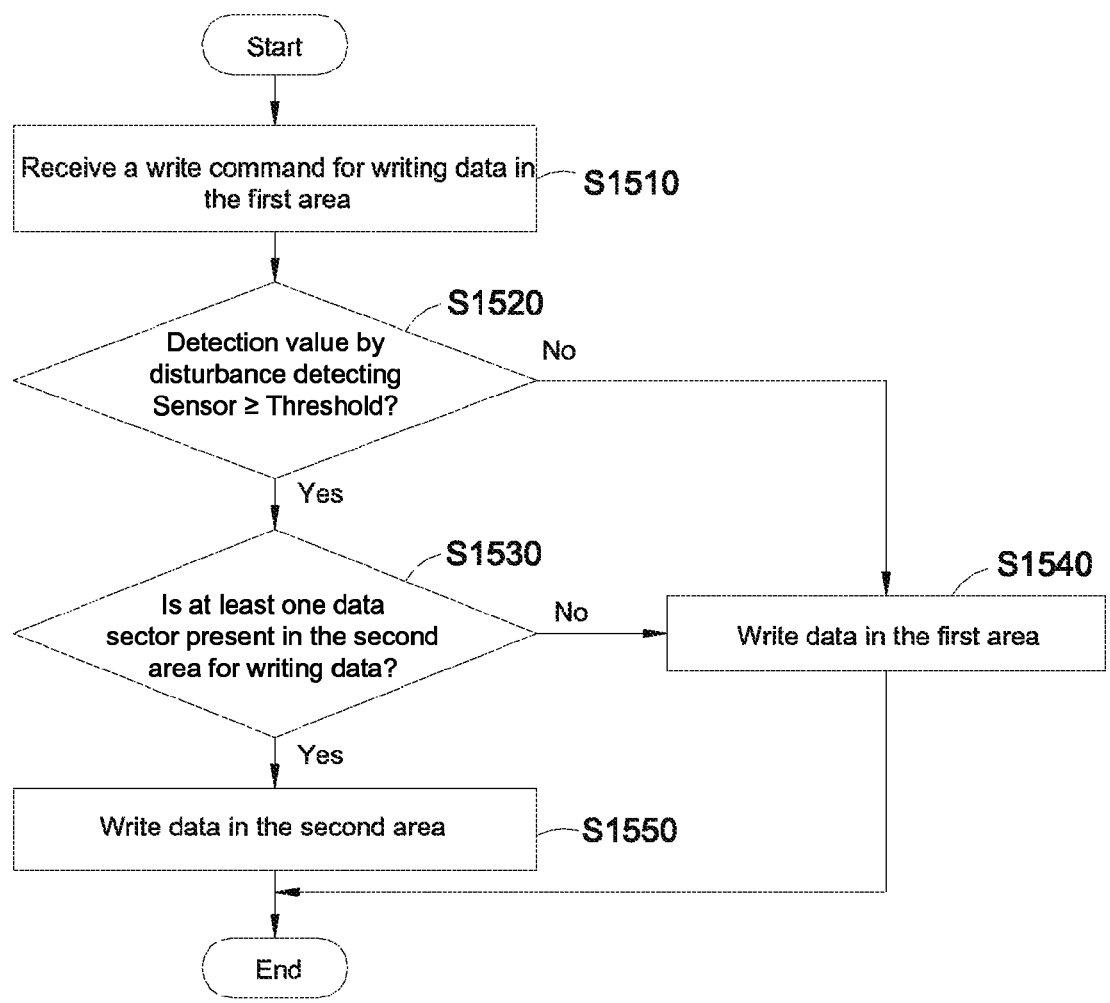
FIG. 15 is a flow chart describing another embodiment of a write method according to the technical concept of the present invention.

FIG. 15 is a flow chart describing another embodiment of the write method according to the technical concept of the present invention.

In this embodiment of FIG. 15, at least one disturbance detecting sensor is used to check the occurrence of disturbance so as to decide whether the storage medium is in the normal mode or the abnormal mode. As shown in FIGS. 11 and 15, when a write command for writing data in the first area is received (S1510), the mode decision unit 1111 can decide whether the storage medium is in the normal mode or the abnormal mode using a detection value obtained by the at least one disturbance detecting sensor. The disturbance detecting sensor may be an RV (rotary vibration) sensor or a shock sensor. The RV sensor can detect rotary vibration of the storage device 1100, and the shock sensor can detect if the storage device 1100 has been subjected to a shock. In an example, the mode decision unit 1111 can compare a detection value obtained by the disturbance detecting sensor with a threshold (S1520). A lower threshold indicates that the storage device 1100 operates faster but provides lower reliability, and a higher threshold indicates that the storage device 1100 operates slower but provides higher reliability. Therefore, the threshold is preferably determined to have a suitable value.

If the detection value obtained by the disturbance detecting sensor is less than the threshold, the mode decision unit 1111 may decide that the storage medium is in the normal mode. As step 1540, in which the mode decision unit 1111 decides that the storage medium is in the normal mode, corresponds to step 1450 in FIG. 14, it will not be explained in further detail.

Meanwhile, if the detection value obtained by the disturbance detecting sensor is not less than the threshold, the mode decision unit 1111 may decide that the storage medium is in the abnormal mode. As step 1530 through step 1550, in which the mode decision unit 1111 decides that the storage medium is in the abnormal mode, respectively correspond to steps 1440 through step 1460 in FIG. 14, they will not be described in further detail.

As mentioned above in connection with FIG. 14, although not shown in FIG. 15, it should be understood that if the detection value obtained by the disturbance detecting sensor has turned out to be less than the threshold in step 1520, or if it turned out that the second area does not have a space available for writing the received data in step 1530, step 1520 may be performed again without performing step 1540.

In short, the embodiment in FIG. 15 provides a way for performing a write operation while maintaining data reliability, by writing the received data in the second area if it is not appropriate to perform the write operation because of rotary vibration of the storage device 1100 or because a shock is applied to the storage device 1100.

Figure 16:
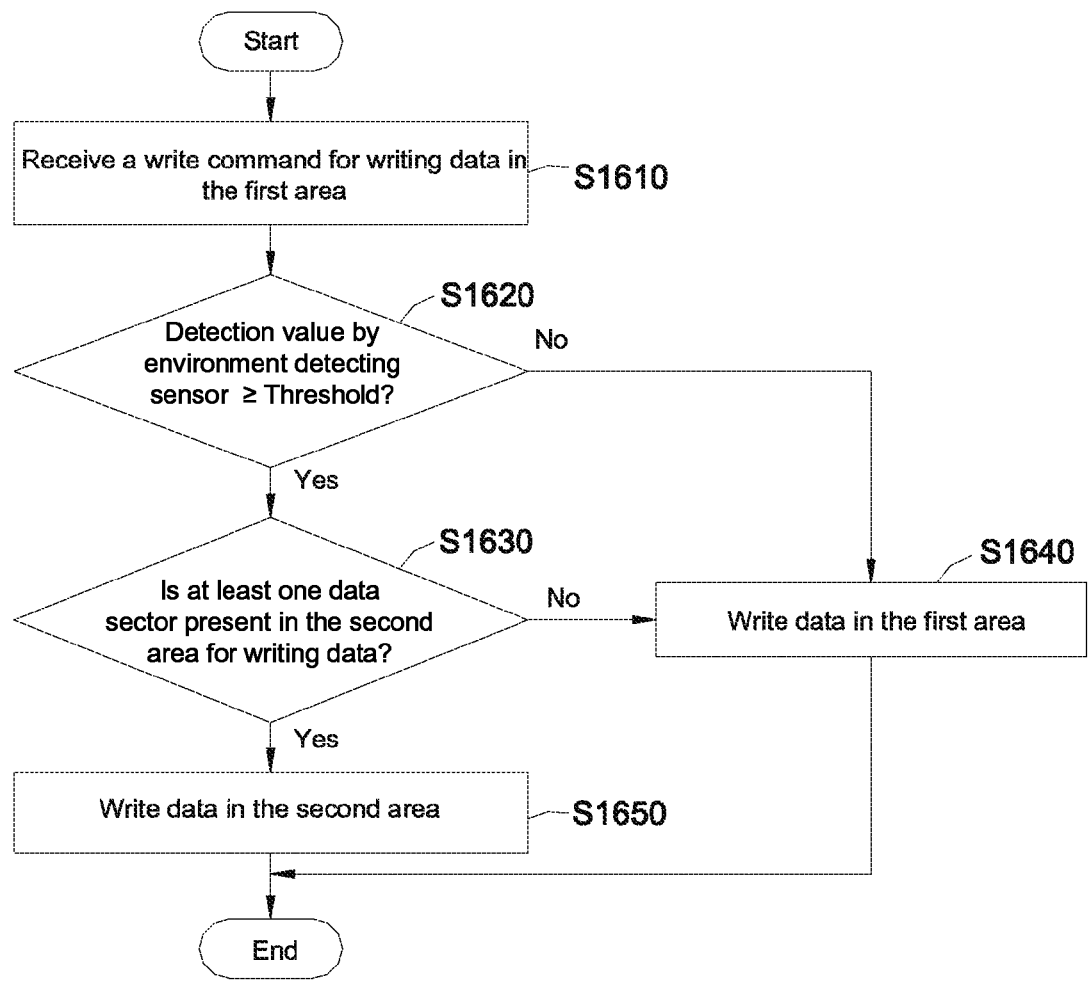
FIG. 16 is a flow chart describing another embodiment of a write method according to the technical concept of the present invention.

FIG. 16 is a flow chart describing another embodiment of the write method according to the technical concept of the present invention.

In this embodiment of FIG. 16, at least one environment detecting sensor is used to check a change in the surrounding environment so as to decide whether the storage medium is in the normal mode or the abnormal mode. As shown in FIGS. 11 and 16, when a write command for writing data in the first area is received (S1610), the mode decision unit 1111 can decide whether the storage medium is in the normal mode or the abnormal mode using a detection value obtained by the at least one environment detecting sensor. The environment detecting sensor can be a temperature sensor, a pressure sensor, or a humidity sensor. In an example, the mode decision unit 1111 can compare a detection value obtained by the environment detecting sensor with a threshold (S1620). A lower threshold indicates that the storage device 1100 operates faster but provides lower reliability, and a higher threshold indicates that the storage device 1100 operates slower but provides higher reliability. Therefore, the threshold is preferably determined to have a suitable value.

If the detection value obtained by the environment detecting sensor is less than the threshold, the mode decision unit 1111 may decide that the storage medium is in the normal mode. As step 1640, in which the mode decision unit 1111 decides that the storage medium is in the normal mode, corresponds to step 1450 in FIG. 14, it will not be explained in further detail. Meanwhile, if the detection value obtained by the environment detecting sensor is not less than the threshold, the mode decision unit 1111 may decide that the storage medium is in the abnormal mode. As step 1630 through step 1650, in which the mode decision unit 1111 decides that the storage medium is in the abnormal mode, respectively correspond to steps 1440 through step 1460 in FIG. 14, they will not be described in further detail.

As mentioned above in connection with FIG. 14, although not shown in FIG. 16, it should be understood that if the detection value obtained by the environment detecting sensor has turned out to be less than the threshold in step 1620, or if it turned out that the second area does not have a space available for writing the received data in step 1630, step 1620 may be performed again without performing step 1640.

In short, the embodiment in FIG. 16 provides a way for performing a write operation while maintaining data reliability, by writing the received data in the second area if at least one of the temperature, pressure and humidity conditions indicates that it is not appropriate to form the write operation.

Figure 17:
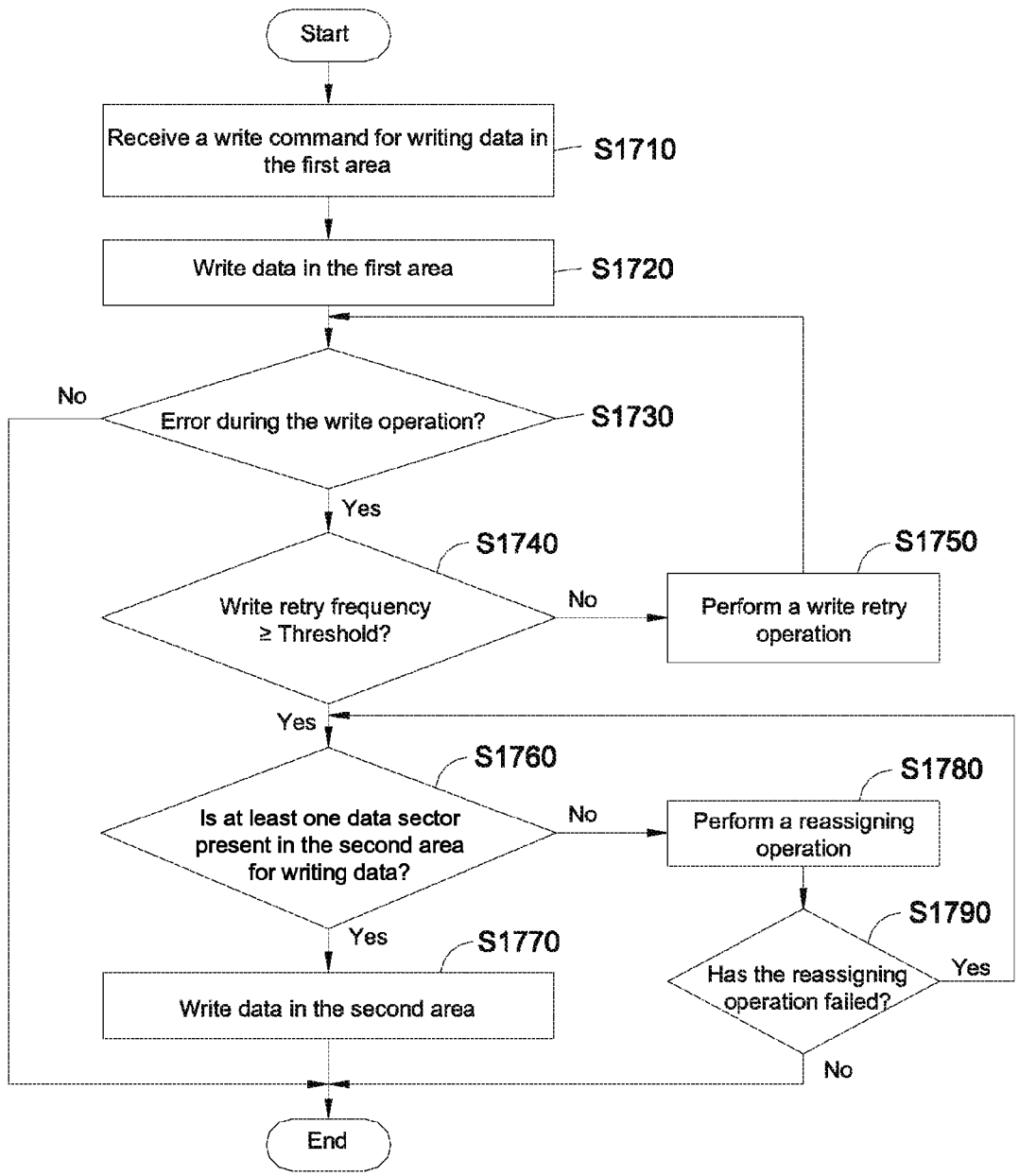
FIG. 17 is a flow chart describing another embodiment of a write method according to the technical concept of the present invention.

FIG. 17 is a flow chart describing another embodiment of the write method according to the technical concept of the present invention.

In this embodiment of FIG. 17, a write retry frequency is used to check the occurrence of disturbance so as to decide whether the storage medium is in the normal mode or the abnormal mode. As shown in FIGS. 11 and 17, when a write command for writing data in the first area is received (S1710), in response to the write command, the R/W control unit 1115 can control the storage medium interface 1150 such that the received data is written in the first area (S1720). The R/W control unit 1115 determines whether an error has occurred while writing the data in the first area (S1730). If it turned out that an error has occurred, the mode decision unit 1111 can compare the frequency of write retry operations performed in the R/W control unit 1115 with a threshold (S1740). A lower threshold indicates that the storage device 1100 operates faster but provides lower reliability, and a higher threshold indicates that the storage device 1100 operates slower but provides higher reliability. Therefore, the threshold is preferably determined to have a suitable value.

If the write retry frequency value is less than the threshold, the mode decision unit 1111 may decide that the storage medium is in the normal mode, and the R/W control unit 1115 may perform the write retry operation (S1750). Here, the write retry operation indicates that a rewrite operation is carried out starting from the location where an error has occurred. Based on the decision result in step 1730, when an error occurs again despite the write retry operation performed in step 1750, step 1740 is performed again.

If the write retry frequency is not less than the threshold, the mode decision unit 1111 can decide that the storage medium is in the abnormal mode. When the mode decision unit 1111 decides that the storage medium is in the abnormal mode, the R/W control unit 1115 may check whether the second area has a space available for writing the received data (S1760). If the second area has a space available for writing the received data, the R/W control unit 1115 can write the received data in the second area (S1770). However, if there is no space in the second area available for writing the received data, the R/W control unit 1115 controls the storage medium interface 1150 to perform a reassigning operation (S1780). The reassigning operation means that the data is written in at least one data sectors, other than the data sector in the first area where the data is being written. The R/W control unit 1115 determines whether the reassigning operation has failed (S1790), and if the reassigning operation has failed, the method can resume, starting from step 1760.

Figure 18:
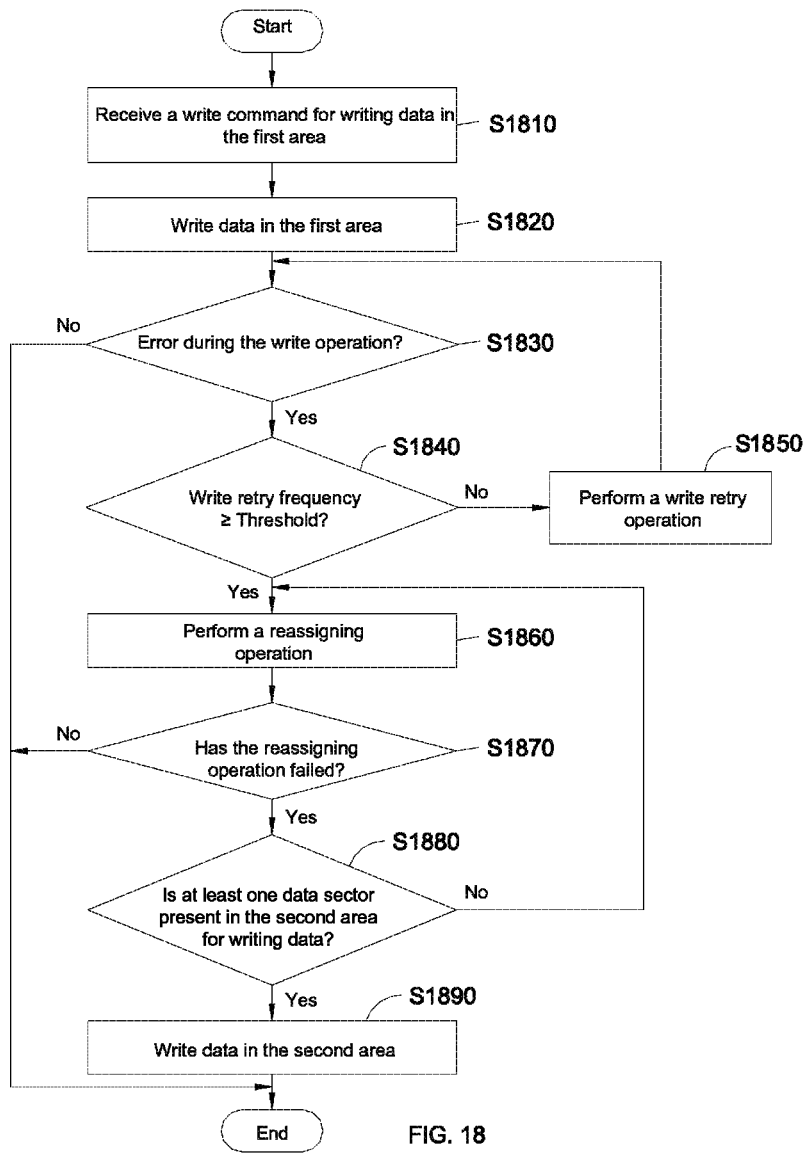
FIG. 18 is a flow chart describing another embodiment of a write method according to the technical concept of the present invention.

FIG. 18 is a flow chart describing another embodiment of the write method according to the technical concept of the present invention. In this embodiment of FIG. 18, a write retry frequency and the success or failure of a reassigning operation are used to decide whether the storage medium is in the normal mode or the abnormal mode. As shown in FIGS. 11 and 18, when a write command for writing data in the first area is received (S1810), in response to the write command, the R/W control unit 1115 can control the storage medium interface 1150 such that the received data is written in the first area (S1820). The R/W control unit 1115 determines whether an error has occurred while writing the data in the first area (S1830). If it turned out that an error has occurred, the mode decision unit 1111 can compare the frequency of write retry operations performed in the R/W control unit 1115 with a threshold (S1840). A lower threshold indicates that the storage device 1100 operates faster but provides lower reliability, and a higher threshold indicates that the storage device 1100 operates slower but provides higher reliability. Therefore, the threshold is preferably determined to have a suitable value.

If the write retry frequency value is less than the threshold, the mode decision unit 1111 may decide that the storage medium is in the normal mode, and the R/W control unit 1115 may perform the write retry operation (S1850). Here, the write retry operation indicates that a rewrite operation is carried out starting from the location where an error has occurred. Based on the decision in step 1830, when an error occurs again despite the write retry operation performed in step 1850, step 1840 is performed again.

If the write retry frequency is not less than the threshold, the R/W control unit 1115 may control the storage medium interface 1150 such that a reassigning operation can be performed (S1860). The reassigning operation means that the data is written in at least one data sectors, other than the data sector in the first area where the data is being written. The R/W control unit 1115 can decide whether the reassigning operation has failed (S1870), and if the reassigning operation has failed the mode decision unit 1111 can decide that the storage medium is in the abnormal mode. If the mode decision unit 1111 decided that the storage medium is in the abnormal mode, the R/W control unit 1115 can check if the second area has a space available for writing the received data (S1880). If the second area has a space available for writing the received data, the R/W control unit 1115 can write the received data in the second area (S1890). However, if there is no space in the second area available for writing the received data, the R/W control unit 1115 can resume the method, starting from step 1860.

Figure 19:
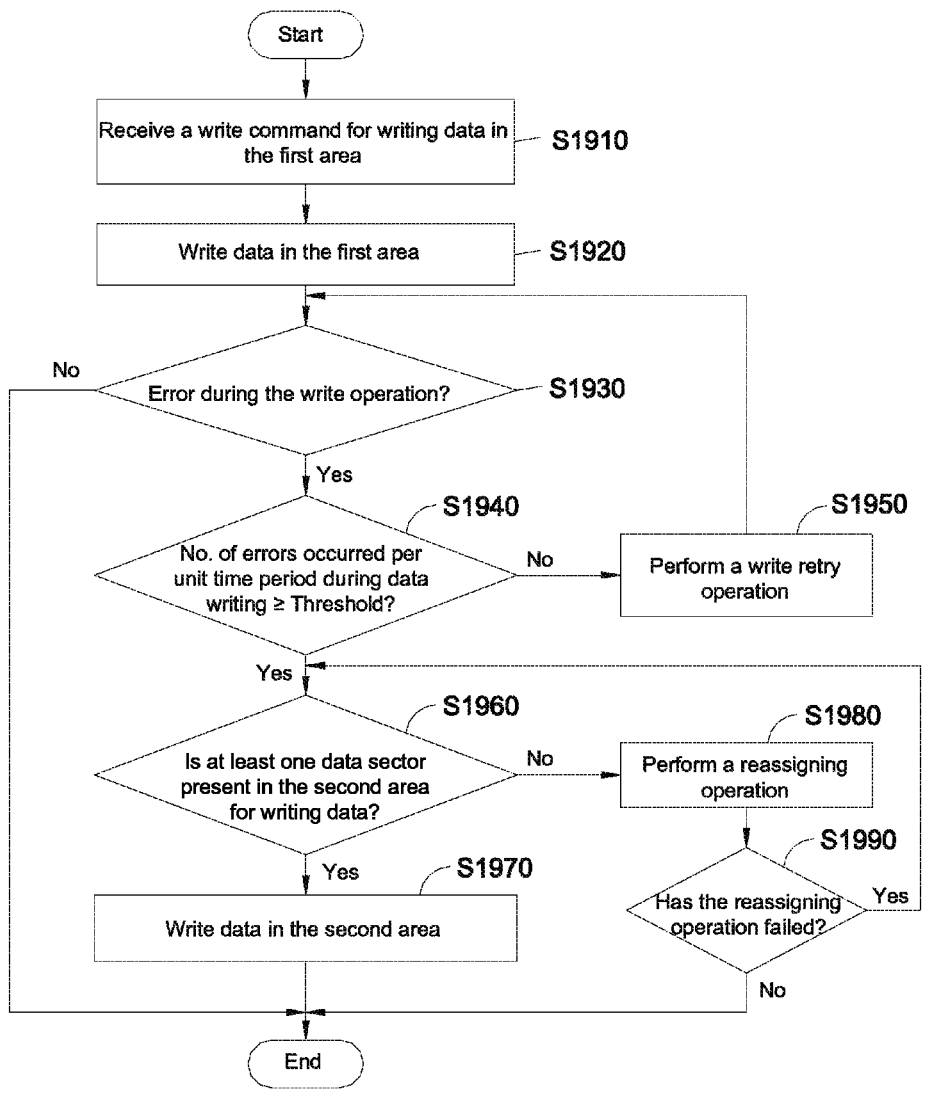
FIG. 19 is a flow chart describing another embodiment of a write method according to the technical concept of the present invention.

FIG. 19 is a flow chart describing another embodiment of the write method according to the technical concept of the present invention. In this embodiment of FIG. 19, the frequency of errors occurred per unit time period during the write operation is used to decide whether the storage medium is in the normal mode or the abnormal mode. The embodiment in FIG. 17 and the embodiment in FIG. 19 are similar in other steps and only different from each other in that the embodiment in FIG. 17 compares a write retry frequency with a threshold (S1740) by means of the mode decision unit 1111, while the embodiment in FIG. 19 compares the frequency of errors occurred per unit time period with a threshold by means of the mode decision unit 1111 (S1940), so as to be able to decide whether the storage medium is in the normal mode or the abnormal mode. In other words, as step 1910 through step 1930 and step 1950 through step 1990 in FIG. 19 correspond to step 1710 through 1730 and step 1750 through step 1790 in FIG. 17, respectively, step 1910 through step 1930 and step 1950 through step 1990 in FIG. 19 will not be described in further detail.

Figure 20:
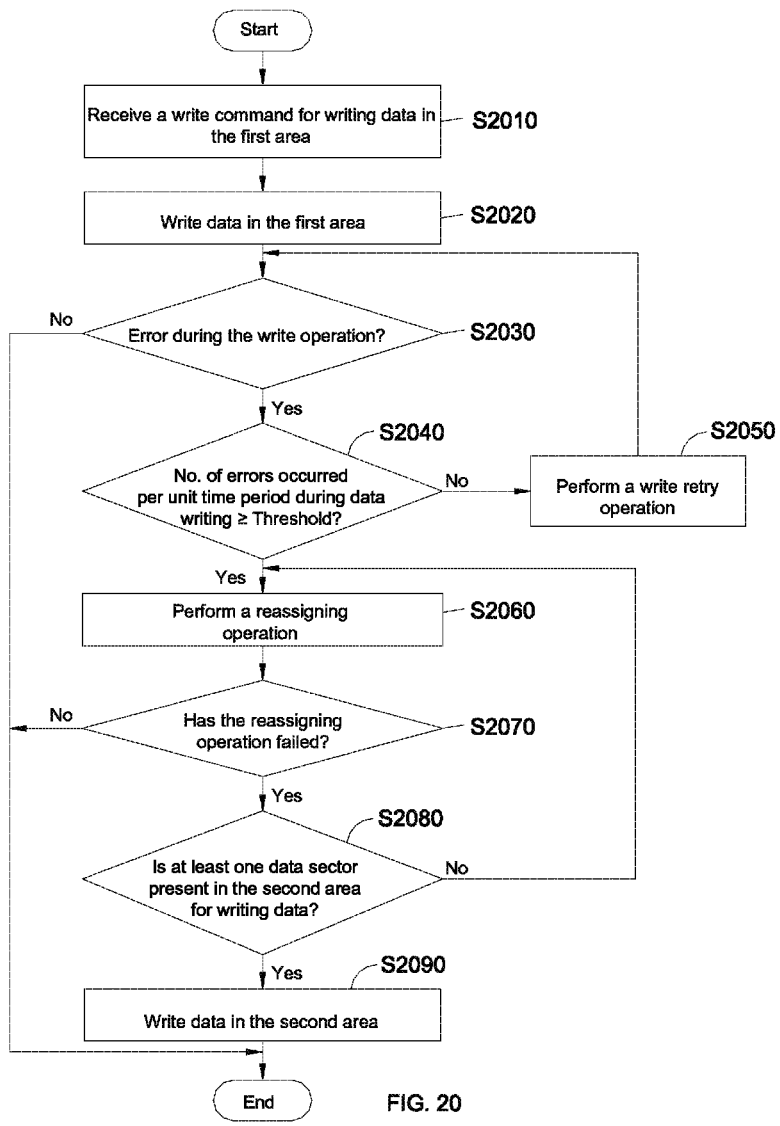
FIG. 20 is a flow chart describing another embodiment of a write method according to the technical concept of the present invention.

FIG. 20 is a flow chart describing another embodiment of the write method according to the technical concept of the present invention.

In this embodiment of FIG. 20, the frequency of errors occurred per unit time period during the write operation and the success or failure of a reassigning operation are used to decide whether the storage medium is in the normal mode or the abnormal mode. The embodiment in FIG. 18 and the embodiment in FIG. 20 are similar in other steps and only different from each other in that the embodiment in FIG. 18 compares a write retry frequency with a threshold (S1840) by means of the mode decision unit 1111, while the embodiment in FIG. 20 compares the frequency of errors occurred per unit time period with a threshold by means of the mode decision unit 1111 (S2040). In other words, as step 1810 through step 1830 and step 1850 through step 1890 in FIG. 18 correspond to step 2010 through 2030 and step 2050 through step 2090 in FIG. 20, respectively, step 2010 through 2030 and step 2050 through step 2090 in FIG. 20 will not be described in further detail.

Figure 21:
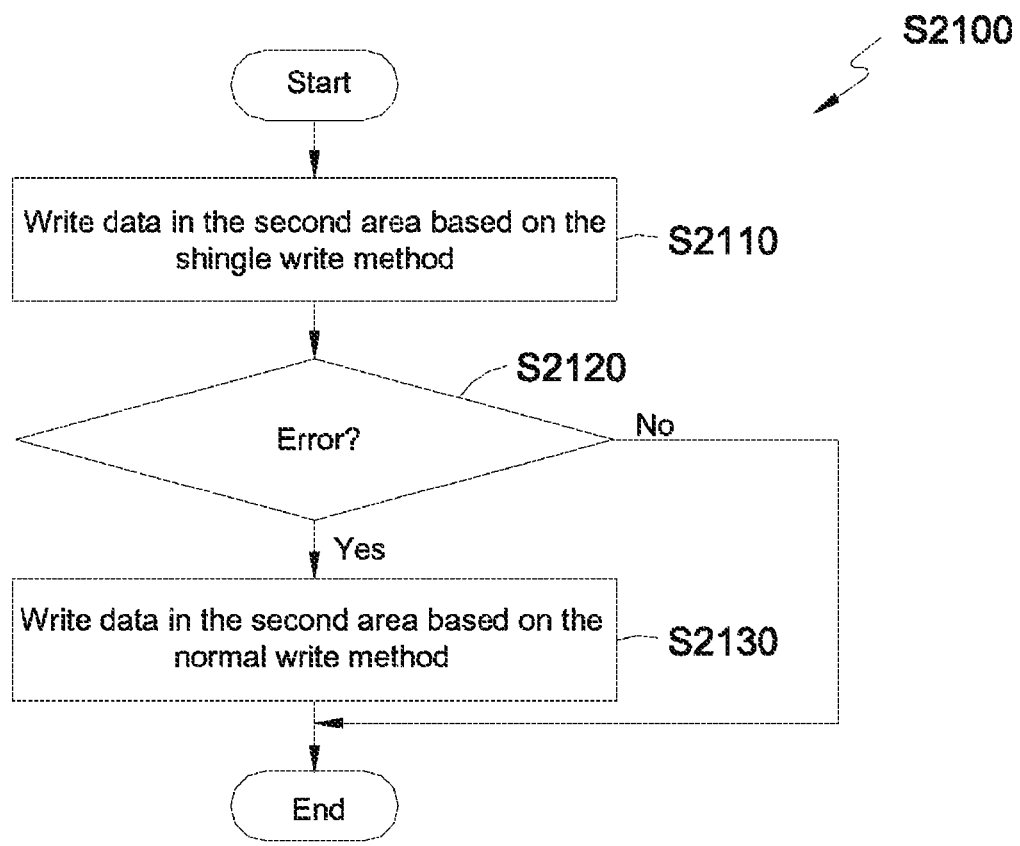
FIG. 21 is a flow chart describing another embodiment of the step of writing data in the second area according to those embodiments of FIG. 13 through FIG. 20.

FIG. 21 is a flow chart describing one embodiment of the step of writing data in the second area described in the embodiments of FIGS. 13 through 20.

Referring to FIGS. 11 through 21, the step of writing data in the second area described the embodiments of FIGS. 13 through 20 can be done as in FIG. 21. However, it is not absolutely required to perform the step of writing data in the second area described in the embodiments of FIGS. 13 through 20 as in FIG. 21, and the data can be written in the second area by any other methods as well.

For the step of writing the data in the second area described in the embodiments of FIGS. 13 through 20, the R/W control unit 1115 can first perform the step of controlling the storage medium interface 1150 such that data can be written in the second area based on the shingle write method (S2110). The R/W control unit can determine whether an error has occurred while writing the data based on the shingle write method, or whether the data has been written in the second area without any error (S2120). If it turned out in step 2120 that an error has occurred, the R/W control unit 1115 can control the storage medium interface 1150 such that data can be written in the second area based on the normal write method (S2130).

When the step of writing the data in the second area described in the embodiments in FIGS. 13 through 20 is performed according to the embodiment in FIG. 21, the normal write method is applied to the data writing in the second area after finding out that an error has caused while writing the data in the second area based on the shingle write method, such that the second area having a lower recording density than that of the first area can be utilized efficiently.

Figure 22:
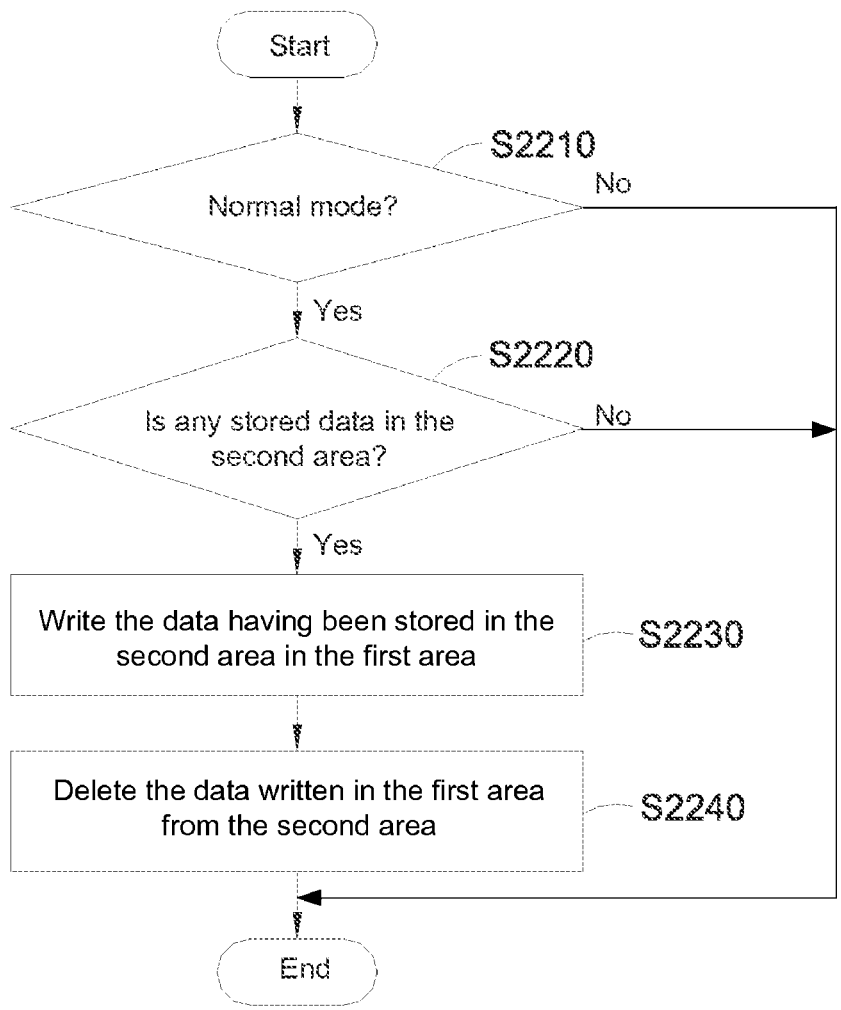
FIG. 22 is a flow chart describing another embodiment of a write method according to the technical concept of the present invention, after writing data in the second area according to the embodiments of FIG. 13 through FIG. 21.

FIG. 22 is a flow chart describing one embodiment of the write method according to the technical concept of the present invention, which is carried out after writing the data in the second area following the embodiments described in the FIGS. 13 through 21. The following will now describe the write method described in FIG. 22 with reference to FIGS. 11 through 22, based on an assumption that the data has been written in the second area following the embodiments described in FIGS. 13 through 21.

After writing the data in the second area, the mode decision unit 1111 can decided whether the storage medium is in the normal mode (S2210). For instance, when the storage device 1100 is in an idle state, the mode decision unit 1111 can decide whether the storage medium is in the normal mode. If it turned out in step 2210 that the storage medium is in the normal mode, the R/W control unit 1115 can decide the presence of the data stored in the second area (S2220). If the data is present in the second area, the R/W control unit 1115 can read the data stored in the second area and write the read data in the first area (S2230). Also, the R/W control unit 1115 can delete the data written in the first area from the second area (S2240). If mapping information about the data written as described in the embodiments of FIGS. 12 through 21 and the data written sector in the second area has been created and stored in a mapping table, the mapping information is changed and stored in the mapping table in step 2230. Further, among the mapping information stored in the mapping table, the mapping information about the written data and the data written sector in the second area can be deleted in step 2240.

Figure 23:
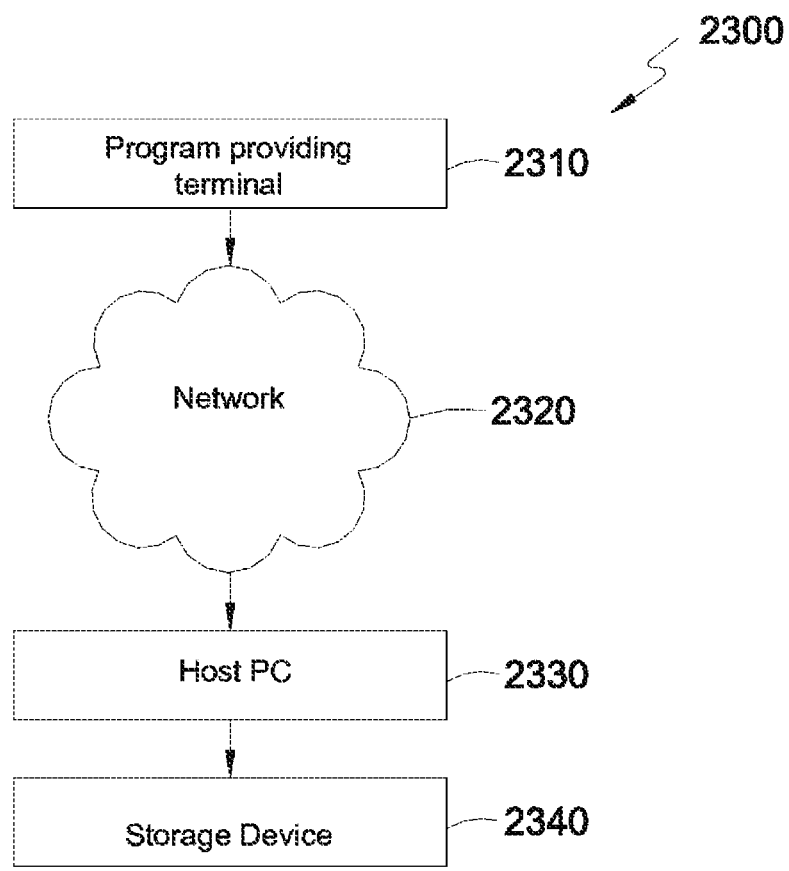
FIG. 23 illustrates a schematic view of one embodiment of a network system for describing the write method of a storage device via a network, according to the technical concept of the present invention.

FIG. 23 is a schematic diagram of a network system 2300, in order to describe one embodiment of a write method in the storage device via a network according to the technical concept of the present invention.

As shown in FIG. 23, the network system 2300 can include a program providing terminal 2310, a network 2320, a host PC 2330, and a storage device 2340.

The network can be a communication network such as Internet. Needless to say, it can be implemented as a wired communication network as well as a wireless communication network.

The program providing terminal 2310 stores a program for the write operation as described in the flow charts of FIGS. 13 through 22. The program providing terminal 2310 transmits a read operation control program or a write operation control program to the host PC 2330, in response to a program transmission request by the host PC 2330 connected through the network 2320.

The host PC 2330 includes hardware and software, through which the host PC 2330 can request the transmission of a read operation control program or a write operation control program after it is connected to the program providing terminal 2310 via the network 2320, and download the requested program from the program providing terminal 2310. As such, the host PC 2330 makes it possible to perform the write methods as described in the flow charts of FIGS. 13 through 22 in the storage device 2340, following the downloaded program from the program providing terminal 2310. Since the embodiments of the write method according to the technical concept of the present invention are already described in connection with FIGS. 13 through 22, they will not be described in further detail.

The present invention can be implemented in as a method, device, system or the like. When it is implemented as software, those configurational elements of the present invention become code segments for executing essentially necessary jobs. Programs or code segments can be stored in a processor-readable medium. Examples of the processor-readable medium include an electronic circuit, a semiconductor memory device, a ROM, a flash memory, an EROM (Erasable ROM), a floppy disc, an optical disc, a hard disc and the like.

In some embodiments, a write method can comprise the steps of: receiving a write command for writing data in a first area of a storage medium; deciding whether the storage medium is in an abnormal mode where the data cannot be written normally in the first area; and if the storage medium is determined to be in the abnormal mode, writing the data in a second area that has a lower recording density than that of the first area. A write method may also include wherein the decision step comprises determining whether the storage medium is in an abnormal mode due to disturbance or a change in surrounding environment, making it impossible to write data in the first area. A write method may also include wherein the decision step comprises: writing the data in the first area, in response to the write command; and determining the abnormal mode using the frequency of a write retry operation performed or the number of error occurred per unit time period, while writing the data in the first area. A write method may also include wherein the decision step comprises: writing the data in the first area, in response to the write command; if the frequency of a write retry operation while writing the data in the first area is not less than a first threshold, or if the number of errors occurred per unit time period while writing the data in the first area is not less than a second threshold, performing a reassigning operation such that the data is rewritten in at least one other data sector in the first area; and if the reassigning operation fails, determining the abnormal mode. A write method may also include wherein the data writing step comprises: writing the data in the second area based on a shingle write method, in which data is written consecutively in one direction; and if the data is not written normally in the second area based on the shingle write method, writing the data in the second area based on a normal write method. A write method may also include wherein the data writing step comprises: determining whether at least one data sector is present in the second area where the data can be written; if the at least one data sector is present, writing the data in the second area; and if the at least one data sector is not present, writing the data in the first area. A write method may also include wherein if the abnormal mode is changed to a normal mode where data can be written normally in the first area, the write method further comprises the steps of: reading data written in the second area and writing the data in the first area; and if the data is written normally in the first area, deleting the data written in the first area from the second area.

In another embodiment, a storage device may comprise: a storage medium including a first area, and a second area having a lower recording medium than that of the first area; a storage medium interface, through which stored data is read from the storage medium or data is written in the storage medium; and a processor for controlling the storage medium interface such that received data is written in the first area or the second area, wherein the processor controls the storage medium interface such that the received data is written in the second area if the storage medium is in an abnormal mode, making it impossible to write data normally in the first area. A storage device may also include wherein the processor includes: a mode decision unit for determining whether the storage medium is in the abnormal mode due to disturbance or a change in surrounding environment; and a read/write control unit for controlling the storage medium interface such that the received data is written in the first area or the second area, in response to a decision result made by the mode decision unit. A storage device may also include wherein the processor includes: a read/write control unit for controlling the storage medium interface such that the received data is written in the first area, in response to a received write command; and a mode decision unit for deciding the abnormal mode by using the frequency of a write retry operation performed while writing the received data in the first area, or the number of errors occurred per unit time period while writing the received data in the first area.

The foregoing embodiment and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method comprising:
    receiving a command to store data to a first area of a data storage device;
    detecting whether the data storage device is in a first state indicating a first level of reliability in writes to the first area; and
    writing the data to a second area of the data storage device when the first state is detected, the second area configured to store data in a first storage format having a lower data recording density than a second storage format of the first area, the second storage format includes a shingled recording format, and the first storage format includes a non-shingled recording format.

2. The method of claim 1 further comprising the first state has a lower reliability in writes than a second state.

3. The method of claim 2 further comprising the second state is a normal operating state and the first state is an abnormal operating state.

4. The method of claim 2 further comprising detecting whether the data storage device is in a first state includes comparing a position error signal against a threshold value and determining that the data storage device is in the first state when the position error signal exceeds the threshold.

5. The method of claim 2 further comprising detecting whether the data storage device is in a first state includes comparing a reading from a physical disturbance sensor against a threshold value and determining that the data storage device is in the first state when the reading exceeds the threshold.

6. The method of claim 5 further comprising the physical disturbance sensor detects rotary vibrations or shocks to the data storage device.

7. The method of claim 2 wherein detecting whether the data storage device is in a first state includes comparing a reading from an environmental sensor against a threshold value and determining that the data storage device is in the first state when the reading exceeds the threshold.

8. The method of claim 7 further comprising the environmental sensor detects a temperature rating, pressure rating, or humidity rating of the data storage device.

9. The method of claim 2 further comprising detecting whether the data storage device is in a first state includes comparing a write retry frequency against a threshold value and determining that the data storage device is in the first state when the write retry frequency exceeds the threshold, the write retry frequency based on attempts to write data again after a data write error occurs.

10. The method of claim 2 further comprising detecting whether the data storage device is in a first state includes comparing a number of errors per unit of time against a threshold value and determining that the data storage device is in the first state when the number of errors per unit of time exceeds the threshold, the errors per unit of time based on errors detected while writing data.

11. The method of claim 1, further comprising transferring the data from the second area to the first area when the first state is no longer detected.

12. The method of claim 1 further comprising writing the data to the second area includes:
    writing data to the second area in a shingled manner, the shingled manner comprising a data writing manner where data recorded to a first track of a data storage medium is partially overwritten by data recorded to a second track of the data storage medium, and wherein data cannot be written to the first track once data has been written to the second track; and
    writing data to the second area in a non-shingled manner if writing in a shingled manner fails.

13. An apparatus comprising:
a data storage device including:
  a data storage medium having a first area and a second area, the second area configured to store data in a first storage format having a lower data recording density than a second storage format of the first area, the second storage format includes a shingled recording format, and the first storage format includes a non-shingled recording format;
  a controller configured to:
    receive a command to write data to the first area;
    determine whether the data storage device is in a first mode, the first mode caused by disturbance to the data storage device and indicating a first level of reliability in writes to the first area; and
    write data pursuant to the command to the second area when the data storage device is determined to be in the first mode.

14. The apparatus of claim 13, further comprising the first mode state has a lower reliability in data writes than a second state.

15. The apparatus of claim 13, further comprising the controller is further configured to transfer the data written to the second area to the first area when the data storage device is no longer in the first mode.

16. The apparatus of claim 13, the controller further configured to:
  write the data to the second area in a shingled manner, the shingled manner comprising a data writing manner where data recorded to a first track of a data storage medium is partially overwritten by data recorded to a second track of the data storage medium, and wherein data cannot be written to the first track once data has been written to the second track; and
  write data to the second area in a non-shingled manner if writing in a shingled manner fails.

17. An apparatus comprising:
a processor configured to:
  receive a command from a host device to write data to a first area of a data storage device;
  detect whether the data storage device is in a first mode caused by physical disturbance and indicating a reduced writing reliability relative to a second mode; and
  write the data to a second area of the data storage device when the first mode is detected, the second area configured to store data in a first data storage format having a higher recording reliability than a second data storage format of the first area, the first area includes a shingled recording format and second area includes a non-shingled recording format.

18. The apparatus of claim 17, further comprising the first area has a higher recording density than the second area.

19. The apparatus of claim 17 further comprising the processor is configured to detect the first mode by comparing a detected value against a threshold and determining that the data storage device is in the first mode when the detected value exceeds the threshold.

20. The apparatus of claim 19 further comprising the detected value is based on a reading from a group consisting of:
  a detected position error signals for a transducer;
  a disturbance detecting sensor;
  an environment detecting sensor;
  write retry frequency; and
  write errors per unit time.

21. The apparatus of claim 17, the processor further configured to:
  write the data to the second area in a shingled manner, the shingled manner comprising a data writing manner where data recorded to a first track of a data storage medium is partially overwritten by data recorded to a second track of the data storage medium, and wherein data cannot be written to the first track once data has been written to the second track; and
  write data to the second area in a non-shingled manner if writing in a shingled manner fails.

* * * * *